US012183240B2

(12) United States Patent
Yang et al.

(10) Patent No.: US 12,183,240 B2
(45) Date of Patent: Dec. 31, 2024

(54) DISPLAY PANEL AND DISPLAY DEVICE

(71) Applicant: Samsung Display Co., Ltd., Yongin-Si (KR)

(72) Inventors: Jin-Wook Yang, Suwon-si (KR); Soon-Dong Kim, Osan-si (KR); Chang-Noh Yoon, Seoul (KR); Eun-Gyeong Choe, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/106,418

(22) Filed: Feb. 6, 2023

(65) Prior Publication Data

US 2023/0186814 A1 Jun. 15, 2023

Related U.S. Application Data

(63) Continuation of application No. 17/256,238, filed as application No. PCT/KR2019/007841 on Jun. 27, 2019, now Pat. No. 11,574,578.

(30) Foreign Application Priority Data

Aug. 2, 2018 (KR) ........................ 10-2018-0090529

(51) Int. Cl.
*G09G 3/20* (2006.01)

(52) U.S. Cl.
CPC ... *G09G 3/2003* (2013.01); *G09G 2300/0452* (2013.01); *G09G 2310/0278* (2013.01); *G09G 2310/0297* (2013.01)

(58) Field of Classification Search
None
See application file for complete search history.

(56) References Cited

U.S. PATENT DOCUMENTS

2005/0253797 A1* 11/2005 Kamada ............ G02F 1/133753 345/89
2006/0197882 A1* 9/2006 Oh ........................ G09G 3/3648 349/43

(Continued)

FOREIGN PATENT DOCUMENTS

CN 1912691 A 2/2007
CN 106292096 A 1/2017

(Continued)

OTHER PUBLICATIONS

Chinese Office Action corresponding to Application No. 201980049481.6 , dated on Dec. 12, 2023, 7 pages.

*Primary Examiner* — Patrick N Edouard
*Assistant Examiner* — Peijie Shen
(74) *Attorney, Agent, or Firm* — Innovation Counsel LLP

(57) ABSTRACT

A display panel includes a first pixel group including sub-pixels coupled to a first scan line and located in first through N-th sub-pixel columns, where N is an even number greater than or equal to 2, a second pixel group including sub-pixels coupled to the first scan line and located in (N+1)-th through 2N-th sub-pixel columns, a third pixel group including sub-pixels coupled to a second scan line adjacent to the first scan line and located in the first through N-th sub-pixel columns, and a fourth pixel group including sub-pixels coupled to the second scan line and located in the (N+1)-th through 2N-th sub-pixel columns. The first pixel group and the second pixel group are driven during a first scan on time in which the first scan line is driven. Consecutive N−1 sub-pixels among the sub-pixels of the third pixel group and one sub-pixel among the sub-pixels of the fourth pixel group are driven during a first portion of a second scan on time in which the second scan line is driven, and consecutive N−1 sub-pixels among the sub-pixels of the fourth pixel group (Continued)

and one sub-pixel among the sub-pixels of the third pixel group are driven during a second portion of the second scan on time.

9 Claims, 33 Drawing Sheets

(56) References Cited

U.S. PATENT DOCUMENTS

2007/0030238 A1 2/2007 Lin et al.
2007/0057877 A1 3/2007 Choi et al.
2007/0164964 A1* 7/2007 Ha .................... G09G 3/3607 345/98
2008/0068524 A1* 3/2008 Kim .................. G02F 1/136286 349/139
2008/0198283 A1* 8/2008 Yoon .................... G09G 3/3648 349/37
2009/0251615 A1* 10/2009 Tsubata ................ G09G 3/3648 438/34
2014/0152640 A1* 6/2014 Chen .................... G09G 3/3607 345/212
2015/0145843 A1* 5/2015 Park ......................... G09G 3/20 345/209
2015/0185568 A1* 7/2015 Zheng ............... G02F 1/136286 257/773
2015/0221273 A1 8/2015 Lee et al.
2016/0189671 A1 6/2016 Kim et al.
2017/0061928 A1* 3/2017 Kim ..................... G09G 3/3685
2017/0069271 A1* 3/2017 Kim ...................... H01L 27/124
2017/0076665 A1* 3/2017 Kim ..................... G09G 3/3225
2017/0140706 A1* 5/2017 Song .................... G09G 3/3233
2017/0309230 A1 10/2017 Kwon et al.
2017/0323610 A1* 11/2017 Lin ...................... G09G 3/3648
2017/0352302 A1 12/2017 Kim
2018/0047353 A1* 2/2018 Lin ...................... G09G 3/3607
2018/0151145 A1 5/2018 Lee et al.
2018/0261150 A1* 9/2018 Tamura ................ G09G 3/2074
2019/0005902 A1* 1/2019 Chen .................... G09G 3/3648
2019/0066622 A1* 2/2019 Lin ...................... G09G 3/3688
2019/0080651 A1* 3/2019 Kim ..................... G09G 3/3225
2019/0181065 A1 6/2019 Ko et al.
2020/0380903 A1* 12/2020 Dong ................... G09G 3/3225

FOREIGN PATENT DOCUMENTS

CN 108122526 A 6/2018
JP 2016-071320 A 5/2016
KR 10-2014-0145444 A 12/2014
KR 10-2016-0066588 A 6/2016
KR 10-2016-0082784 A 7/2016
KR 10-2016-0090975 A 8/2016
KR 10-2017-0001816 A 1/2017
KR 10-2017-0081108 A 7/2017
KR 10-2017-0121770 A 11/2017
KR 10-2018-0000037 A 1/2018
KR 10-2018-0080741 A 7/2018
KR 10-2019-0015664 A 2/2019
KR 10-2019-0030266 A 3/2019
KR 10-2019-0062679 A 6/2019

* cited by examiner

FIG. 6

410

| | SC1 | SC2 | SC3 | SC4 |
|---|---|---|---|---|
| SSOT1 | DR1 | DG1 | DB1 | DG'1 |
| SSOT2 | DR2 | DG2 | DB2 | DG'2 |
| SSOT3 | DR3 | DG3 | DB3 | DG'3 |
| SSOT4 | DR4 | DG4 | DB4 | DG'4 |

REMAPPING

430

| | SC1 | SC2 | SC3 | SC4 |
|---|---|---|---|---|
| SSOT1 | DR1 | DG1 | DB1 | DG'1 |
| SSOT2 | DR2 | DG2 | DB2 | DG'2 |
| SSOT3 | DR3 | DG4 | DB3 | DG'3 |
| SSOT4 | DR4 | DG3 | DB4 | DG'4 |

FIG. 10

510

| | SC1 | SC2 | SC3 | SC4 |
|---|---|---|---|---|
| SSOT1 | DR1 | DG1 | DB1 | DG'1 |
| SSOT2 | DR2 | DG2 | DB2 | DG'2 |
| SSOT3 | DR3 | DG3 | DB3 | DG'3 |
| SSOT4 | DR4 | DG4 | DB4 | DG'4 |

⇩ REMAPPING

530

| | SC1 | SC2 | SC3 | SC4 |
|---|---|---|---|---|
| SSOT1 | DR1 | DG1 | DB1 | DG'1 |
| SSOT2 | DR2 | DG2 | DB2 | DG'2 |
| SSOT3 | DR3 | DG3 | DB4 | DG'3 |
| SSOT4 | DR4 | DG4 | DB3 | DG'4 |

@SSOT1

@SSOT2

DISPLAY PANEL AND DISPLAY DEVICE

CROSS-REFERENCE TO RELATED APPLICATION(S)

This application is a continuation application of U.S. patent application Ser. No. 17/256,238 filed on Dec. 28, 2020, which claims priority to a U.S. national phase application of International Patent Application No. PCT/KR2019/007841 filed on Jun. 27, 2019, which claims priority to Korean Patent Application No. 10-2018-0090529, filed on Aug. 2, 2018, and all the befits accruing therefrom under 35 U.S.C. § 119, the content of which in its entirety is herein incorporated by reference.

BACKGROUND

1. Field

Exemplary embodiments of the present inventive concept relate to display devices, and more particularly to display panels and the display devices including the display panels.

2. Description of the Related Art

As a resolution of a display device increases, the number of source channels of a data driver included in the display device may be increased, and thus a manufacturing cost may be increased. To reduce the manufacturing cost, a demultiplexing (or demux) driving scheme in which each source channel of a data driver drives two or more of columns of sub-pixels has been developed. In a display device employing the demux driving scheme, since each source channel drives the two or more of columns of sub-pixels in a time division manner, it may not be possible to secure a sufficient threshold voltage compensation time for compensating a threshold voltage of a driving transistor included in each sub-pixel.

To secure the sufficient threshold voltage compensation time, a structure including two data lines in each column of sub-pixels has been developed. In a display device having the structure, a data voltage of a data line coupled to a sub-pixel in a current row may be maintained while a data voltage is applied to a sub-pixel in the next row, and thus the sufficient threshold voltage compensation time of one horizontal time (or 1H time) may be secured. However, since two data lines should be disposed between two adjacent sub-pixel columns, a coupling between the two data lines may occur. To prevent the coupling, a driving method that simultaneously drives the two data lines between the two adjacent sub-pixel columns may be considered. However, to perform the driving method, a data driver should have one or more dummy source channels.

SUMMARY

Some exemplary embodiments provide a display panel capable of preventing a coupling between data lines without a dummy source channel.

Some exemplary embodiments provide a display device capable of preventing a coupling between data lines without a dummy source channel.

According to exemplary embodiments, there is provided a display panel including a first pixel group including sub-pixels coupled to a first scan line and located in first through N-th sub-pixel columns, where N is an even number greater than or equal to 2, a second pixel group including sub-pixels coupled to the first scan line and located in (N+1)-th through 2N-th sub-pixel columns, a third pixel group including sub-pixels coupled to a second scan line adjacent to the first scan line and located in the first through N-th sub-pixel columns, and a fourth pixel group including sub-pixels coupled to the second scan line and located in the (N+1)-th through 2N-th sub-pixel columns. The first pixel group and the second pixel group are sequentially driven during a first scan on time in which the first scan line is driven. Consecutive N−1 sub-pixels among the sub-pixels of the third pixel group and one sub-pixel among the sub-pixels of the fourth pixel group are driven during a first portion of a second scan on time in which the second scan line is driven, and consecutive N−1 sub-pixels among the sub-pixels of the fourth pixel group and one sub-pixel among the sub-pixels of the third pixel group are driven during a second portion of the second scan on time.

In exemplary embodiments, the first scan on time may be divided into a first sub-scan on time and a second sub-scan on time, the sub-pixels of the first pixel group located in the first through N-th sub-pixel columns may be driven during the first sub-scan on time, and the sub-pixels of the second pixel group located in the (N+1)-th through 2N-th sub-pixel columns may be driven during the second sub-scan on time. The second scan on time may be divided into a third sub-scan on time and a fourth sub-scan on time, the N−1 sub-pixels of the third pixel group located in the first through (N−1)-th sub-pixel columns and the one sub-pixel of the fourth pixel group located in the 2N-th sub-pixel column may be driven during the third sub-scan on time, and the consecutive N−1 sub-pixels of the fourth pixel group located in the (N+1) through (2N−1)-th sub-pixel columns and the one sub-pixel of the third pixel group located in the N-th sub-pixel column may be driven during the fourth sub-scan on time.

In exemplary embodiments, the first scan on time may be divided into a first sub-scan on time and a second sub-scan on time, the sub-pixels of the first pixel group located in the first through N-th sub-pixel columns may be driven during the first sub-scan on time, and the sub-pixels of the second pixel group located in the (N+1)-th through 2N-th sub-pixel columns may be driven during the second sub-scan on time. The second scan on time may be divided into a third sub-scan on time and a fourth sub-scan on time, the N−1 sub-pixels of the third pixel group located in the second through N-th sub-pixel columns and the one sub-pixel of the fourth pixel group located in the (N+1)-th sub-pixel column may be driven during the third sub-scan on time, and the consecutive N−1 sub-pixels of the fourth pixel group located in the (N+2) through 2N-th sub-pixel columns and the one sub-pixel of the third pixel group located in the first sub-pixel column may be driven during the fourth sub-scan on time.

In exemplary embodiments, the display panel may further include a plurality of data lines, two data lines of the plurality of data lines disposed in each sub-pixel column.

In exemplary embodiments, the display panel may further include first through 2N-th left data lines disposed at left sides of the first through 2N-th sub-pixel columns, and first through 2N-th right data lines disposed at right sides of the first through 2N-th sub-pixel columns.

In exemplary embodiments, odd-numbered sub-pixels among the sub-pixels of the first and second pixel groups coupled to the first scan line may be coupled to odd-numbered right data lines among the first through 2N-th right data lines, even-numbered sub-pixels among the sub-pixels of the first and second pixel groups coupled to the first scan line may be coupled to even-numbered left data lines among the first through 2N-th left data lines, odd-numbered sub-pixels among the sub-pixels of the third and fourth pixel groups coupled to the second scan line may be coupled to odd-numbered left data lines among the first through 2N-th left data lines, and even-numbered sub-pixels among the sub-pixels of the third and fourth pixel groups coupled to the second scan line may be coupled to even-numbered right data lines among the first through 2N-th right data lines.

In exemplary embodiments, the display panel may further include a demultiplexer circuit configured to couple N source channels to N data lines selected from among the first through 2N-th left data lines and the first through 2N-th right data lines.

In exemplary embodiments, the demultiplexer circuit may include first demux switches configured to couple the N source channels to the even-numbered left data lines among the first through N-th left data lines and the odd-numbered right data lines among the first through N-th right data lines in response to a first demux control signal, second demux switches configured to couple the N source channels to the even-numbered left data lines among the (N+1)-th through 2N-th left data lines and the odd-numbered right data lines among the (N+1)-th through 2N-th right data lines in response to a second demux control signal, third demux switches configured to couple the N source channels to the odd-numbered left data lines among the first through (N−1)-th and 2N-th left data lines and the even-numbered right data lines among the first through (N−1)-th and 2N-th right data lines in response to a third demux control signal, and fourth demux switches configured to couple the N source channels to the odd-numbered left data lines among the N-th through (2N−1)-th left data lines and the even-numbered right data lines among the N-th through (2N−1)-th right data lines in response to a fourth demux control signal.

In exemplary embodiments, the demultiplexer circuit may include first demux switches configured to couple the N source channels to the even-numbered left data lines among the first through N-th left data lines and the odd-numbered right data lines among the first through N-th right data lines in response to a first demux control signal, second demux switches configured to couple the N source channels to the even-numbered left data lines among the (N+1)-th through 2N-th left data lines and the odd-numbered right data lines among the (N+1)-th through 2N-th right data lines in response to a second demux control signal, third demux switches configured to couple the N source channels to the odd-numbered left data lines among the second through (N+1)-th left data lines and the even-numbered right data lines among the second through (N+1)-th right data lines in response to a third demux control signal, and fourth demux switches configured to couple the N source channels to the odd-numbered left data lines among the first and (N+2)-th through 2N-th left data lines and the even-numbered right data lines among the first and (N+2)-th through 2N-th right data lines in response to a fourth demux control signal.

In exemplary embodiments, the N may be four, the first pixel group may include a first R sub-pixel, a first G sub-pixel, a first B sub-pixel and a first G' sub-pixel respectively located in the first through fourth sub-pixel columns, the second pixel group may include a second R sub-pixel, a second G sub-pixel, a second B sub-pixel and a second G' sub-pixel respectively located in the fifth through eighth sub-pixel columns, the third pixel group may include a third B sub-pixel, a third G' sub-pixel, a third R sub-pixel and a third G sub-pixel respectively located in the first through fourth sub-pixel columns, and the fourth pixel group may include a fourth B sub-pixel, a fourth G' sub-pixel, a fourth R sub-pixel and a fourth G sub-pixel respectively located in the fifth through eighth sub-pixel columns.

In exemplary embodiments, the first scan on time may be divided into a first sub-scan on time and a second sub-scan on time, the first R sub-pixel, the first G sub-pixel, the first B sub-pixel and the first G' sub-pixel may be driven during the first sub-scan on time, and the second R sub-pixel, the second G sub-pixel, the second B sub-pixel and the second G' sub-pixel may be driven during the second sub-scan on time. The second scan on time may be divided into a third sub-scan on time and a fourth sub-scan on time, the third B sub-pixel, the third G' sub-pixel, the third R sub-pixel and the fourth G sub-pixel may be driven during the third sub-scan on time, and the third G sub-pixel, the fourth B sub-pixel, the fourth G' sub-pixel and the fourth R sub-pixel may be driven during the fourth sub-scan on time.

In exemplary embodiments, the first scan on time may be divided into a first sub-scan on time and a second sub-scan on time, the first R sub-pixel, the first G sub-pixel, the first B sub-pixel and the first G' sub-pixel may be driven during the first sub-scan on time, and the second R sub-pixel, the second G sub-pixel, the second B sub-pixel and the second G' sub-pixel may be driven during the second sub-scan on time. The second scan on time may be divided into a third sub-scan on time and a fourth sub-scan on time, the third G' sub-pixel, the third R sub-pixel, the third G sub-pixel and the fourth B sub-pixel may be driven during the third sub-scan on time, and the third B sub-pixel, the fourth G' sub-pixel, the fourth R sub-pixel and the fourth G sub-pixel may be driven during the fourth sub-scan on time.

In exemplary embodiments, the N may be two, the first pixel group may include a first R sub-pixel and a first G sub-pixel respectively located in the first and second sub-pixel columns, the second pixel group may include a first B sub-pixel and a first G' sub-pixel respectively located in the third and fourth sub-pixel columns, the third pixel group may include a second B sub-pixel and a second G' sub-pixel respectively located in the first and second sub-pixel columns, and the fourth pixel group may include a second R sub-pixel and a second G sub-pixel respectively located in the third and fourth sub-pixel columns.

In exemplary embodiments, the first scan on time may be divided into a first sub-scan on time and a second sub-scan on time, the first R sub-pixel and the first G sub-pixel may be driven during the first sub-scan on time, and the first B sub-pixel and the first G' sub-pixel may be driven during the second sub-scan on time. The second scan on time may be divided into a third sub-scan on time and a fourth sub-scan on time, the second B sub-pixel and the second G sub-pixel may be driven during the third sub-scan on time, and the second G' sub-pixel and the second R sub-pixel may be driven during the fourth sub-scan on time.

In exemplary embodiments, the first scan on time may be divided into a first sub-scan on time and a second sub-scan on time, the first R sub-pixel and the first G sub-pixel may be driven during the first sub-scan on time, and the first B sub-pixel and the first G' sub-pixel may be driven during the second sub-scan on time. The second scan on time may be divided into a third sub-scan on time and a fourth sub-scan on time, the second G' sub-pixel and the second R sub-pixel may be driven during the third sub-scan on time, and the second B sub-pixel and the second G sub-pixel may be driven during the fourth sub-scan on time.

In exemplary embodiments, the N may be six, the first pixel group may include a first R sub-pixel, a first G sub-pixel, a first B sub-pixel, a second R sub-pixel, a second G sub-pixel and a second B sub-pixel respectively located in the first through sixth sub-pixel columns, the second pixel group may include a third R sub-pixel, a third G sub-pixel, a third B sub-pixel, a fourth R sub-pixel, a fourth G sub-pixel and a fourth B sub-pixel respectively located in the seventh through twelfth sub-pixel columns, the third pixel group may include a fifth R sub-pixel, a fifth G sub-pixel, a fifth B sub-pixel, a sixth R sub-pixel, a sixth G sub-pixel and a sixth B sub-pixel respectively located in the first through sixth sub-pixel columns, and the fourth pixel group may include a seventh R sub-pixel, a seventh G sub-pixel, a seventh B sub-pixel, an eighth R sub-pixel, an eighth G sub-pixel and an eighth B sub-pixel respectively located in the seventh through twelfth sub-pixel columns.

In exemplary embodiments, the first scan on time may be divided into a first sub-scan on time and a second sub-scan on time, the first R sub-pixel, the first G sub-pixel, the first B sub-pixel, the second R sub-pixel, the second G sub-pixel and the second B sub-pixel may be driven during the first sub-scan on time, and the third R sub-pixel, the third G sub-pixel, the third B sub-pixel, the fourth R sub-pixel, the fourth G sub-pixel and the fourth B sub-pixel may be driven during the second sub-scan on time. The second scan on time may be divided into a third sub-scan on time and a fourth sub-scan on time, the fifth R sub-pixel, the fifth G sub-pixel, the fifth B sub-pixel, the sixth R sub-pixel, the sixth G sub-pixel and the eighth B sub-pixel may be driven during the third sub-scan on time, and the sixth B sub-pixel, the seventh R sub-pixel, the seventh G sub-pixel, the seventh B sub-pixel, the eighth R sub-pixel and the eighth G sub-pixel may be driven during the fourth sub-scan on time.

In exemplary embodiments, the first scan on time may be divided into a first sub-scan on time and a second sub-scan on time, the first R sub-pixel, the first G sub-pixel, the first B sub-pixel, the second R sub-pixel, the second G sub-pixel and the second B sub-pixel may be driven during the first sub-scan on time, and the third R sub-pixel, the third G sub-pixel, the third B sub-pixel, the fourth R sub-pixel, the fourth G sub-pixel and the fourth B sub-pixel may be driven during the second sub-scan on time. The second scan on time may be divided into a third sub-scan on time and a fourth sub-scan on time, the fifth G sub-pixel, the fifth B sub-pixel, the sixth R sub-pixel, the sixth G sub-pixel, the sixth B sub-pixel and the seventh R sub-pixel may be driven during the third sub-scan on time, and the fifth R sub-pixel, the seventh G sub-pixel, the seventh B sub-pixel, the eighth R sub-pixel, the eighth G sub-pixel and the eighth B sub-pixel may be driven during the fourth sub-scan on time.

According to exemplary embodiments, there is provided a display panel including M first pixel groups including sub-pixels coupled to a first scan line and located in consecutive N sub-pixel columns, where M is an integer greater than 1, and N is an even number greater than or equal to 2, and second pixel groups, each second pixel group including sub-pixels coupled to a second scan line adjacent to the first scan line and located in the consecutive N sub-pixel columns. The first pixel groups are sequentially driven during a first scan on time in which the first scan line is driven. A second scan on time in which the second scan line is driven is divided into M sub-scan on times, and consecutive N−1 sub-pixels among the sub-pixels of a first one of the second pixel groups and one sub-pixel among the sub-pixels of a second one of the second pixel groups are driven during each sub-scan on time.

According to exemplary embodiments, there is provided a display device including a display panel including a first pixel group including sub-pixels coupled to a first scan line and located in first through N-th sub-pixel columns, where N is an even number greater than or equal to 2, a second pixel group including sub-pixels coupled to the first scan line and located in (N+1)-th through 2N-th sub-pixel columns, a third pixel group including sub-pixels coupled to a second scan line adjacent to the first scan line and located in the first through N-th sub-pixel columns, and a fourth pixel group including sub-pixels coupled to the second scan line and located in the (N+1)-th through 2N-th sub-pixel columns, a scan driver configured to drive the first and second scan lines, a data driver configured to drive the first through fourth pixel groups by applying data voltages to the first through fourth pixel groups, and a controller configured to control the scan driver and the data driver. The data driver sequentially drives the first pixel group and the second pixel group during a first scan on time in which the first scan line is driven. The data driver drives consecutive N−1 sub-pixels among the sub-pixels of the third pixel group and one sub-pixel among the sub-pixels of the fourth pixel group during a first portion of a second scan on time in which the second scan line is driven, and drives consecutive N−1 sub-pixels among the sub-pixels of the fourth pixel group and one sub-pixel among the sub-pixels of the third pixel group during a second portion of the second scan on time.

In exemplary embodiments, the display panel may have an RGBG' pixel structure. The controller may include a data converter configured to convert RGB data into RGBG' data, and a data remapper configured to remap the RGBG' data for the third pixel group and the fourth pixel group.

In exemplary embodiments, the data remapper may swap data for the one sub-pixel of the third pixel group and data for the one sub-pixel of the fourth pixel group in the RGBG' data.

In exemplary embodiments, the display panel may further include a plurality of data lines, two data lines of the plurality of data lines disposed in each sub-pixel column.

In exemplary embodiments, the display panel may further include a demultiplexer circuit configured to couple N source channels to N data lines selected from among the plurality of data lines in response to a plurality of demux control signals received from the controller.

As described above, a display panel and a display device according to exemplary embodiments may include first and second pixel groups coupled to a first scan line and third and fourth pixel groups coupled to a second scan line. The first and second pixel groups may be sequentially driven during a first scan on time, N−1 sub-pixels in the third pixel group and one sub-pixel in the fourth pixel group may be driven during a first portion of a second scan on time, and N−1 sub-pixels in the fourth pixel group and one sub-pixel in the third pixel group may be driven during a second portion of the second scan on time. Accordingly, a coupling between data lines may be prevented without a dummy source channel.

BRIEF DESCRIPTION OF THE DRAWINGS

Illustrative, non-limiting exemplary embodiments will be more clearly understood from the following detailed description in conjunction with the accompanying drawings.

FIG. 6 is a diagram for describing a remapping operation for image data provided to a display panel of FIG. 4.

FIG. 10 is a diagram for describing a remapping operation for image data provided to a display panel of FIG. 8.

DETAILED DESCRIPTION OF THE EMBODIMENTS

Hereinafter, embodiments of the present inventive concept will be explained in detail with reference to the accompanying drawings.

Figure 1:
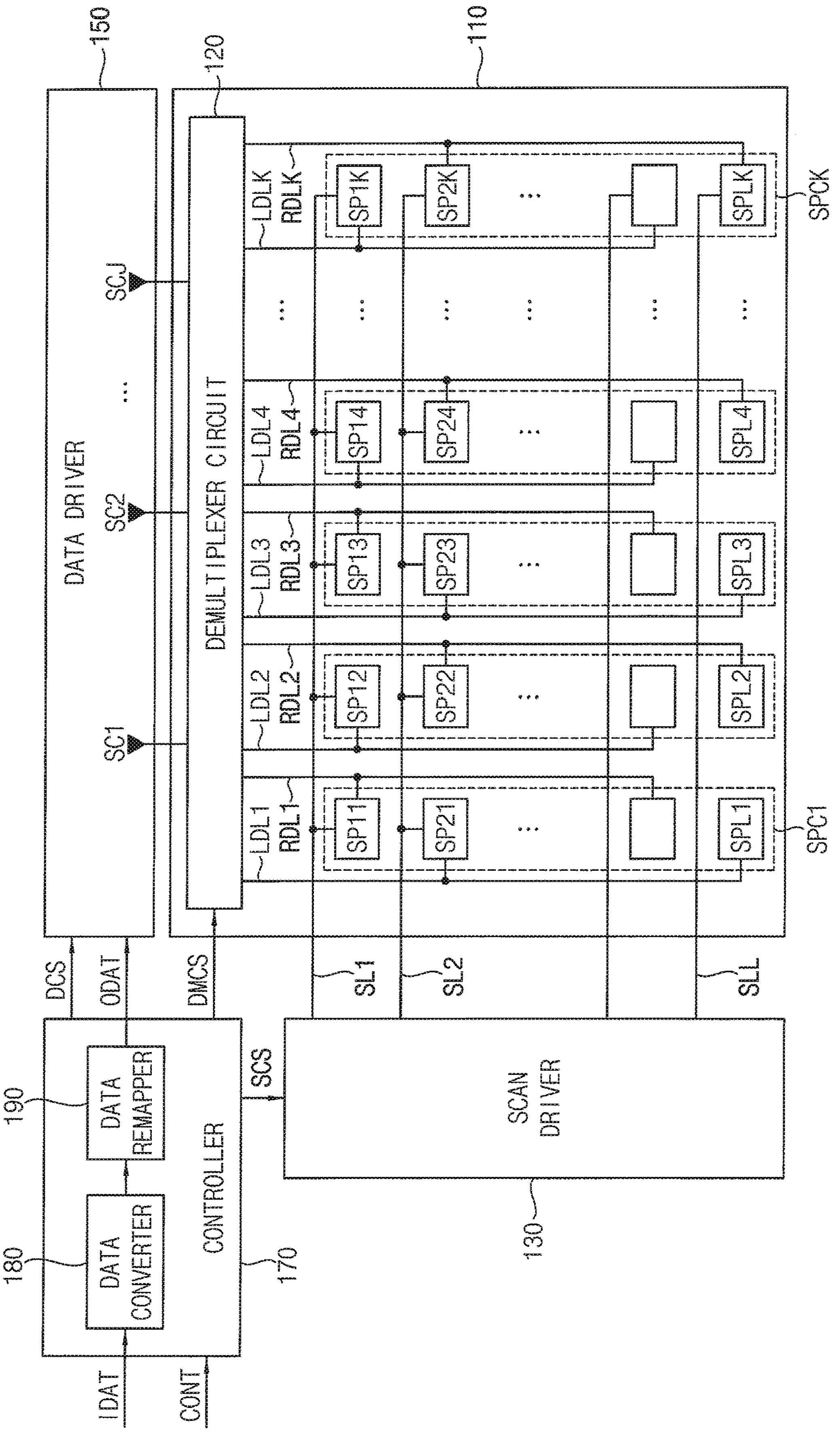
FIG. 1 is a block diagram illustrating a display device according to exemplary embodiments.

FIG. 1 is a block diagram illustrating a display device according to exemplary embodiments.

Referring to FIG. 1, a display device 100 may include a display panel 110 that includes a plurality of sub-pixels SP11 through SPLK, a scan driver 130 that applies scan signals to the plurality of sub-pixels SP11 through SPLK, a data driver 150 that applies data voltages to the plurality of sub-pixels SP11 through SPLK, and a controller 170 (e.g., a timing controller) that controls the scan driver 130 and the data driver 150.

The display panel 110 may include a plurality of data lines LDL1 through LDLK and RDL1 through RDLK, a plurality of scan lines SL1 through SLL, and the plurality of sub-pixels SP11 through SPLK coupled to the plurality of data lines LDL1 through LDLK and RDL1 through RDLK and the plurality of scan lines SL1 through SLL. In some exemplary embodiments, each sub-pixel SP11 through SPLK may include an organic light emitting diode (OLED), and the display panel 110 may be an OLED display panel. In some exemplary embodiments, each sub-pixel SP11 through SPLK may further include a driving transistor that provides a driving current to the OLED, and may perform a threshold voltage compensation operation that compensates a threshold voltage of the driving transistor during a threshold voltage compensation time.

In some exemplary embodiments, two data lines of the plurality of data lines LDL1 through LDLK and RDL1 through RDLK may be disposed in each sub-pixel column SPC1 through SPCK. Thus, the display panel 110 may have K sub-pixel columns SPC1 through SPCK, where K is an integer greater than 1, and may have 2K data lines LDL1 through LDLK and RDL1 through RDLK. For example, as illustrated in FIG. 1, the display panel 110 may include first through K-th left data lines LDL1, LDL2, LDL3, LDL4, . . . , LDLK respectively disposed at left sides of the K sub-pixel columns SPC1 through SPCK, and first through K-th right data lines RDL1, RDL2, RDL3, RDL4, . . . , RDLK respectively disposed at right sides of the K sub-pixel columns SPC1 through SPCK.

The sub-pixels SP11 through SPLK may be alternately coupled to the left data lines LDL1, LDL2, LDL3, LDL4, . . . , LDLK and the right data lines RDL1, RDL2, RDL3, RDL4, . . . , RDLK according to a sub-pixel column direction and according to a sub-pixel row direction. For example, as illustrated in FIG. 1, odd-numbered sub-pixels (e.g., SP11 and SP13 among sub-pixels (e.g., SP11 through SP1K) coupled to an odd-numbered scan line (e.g., a first scan line SL1) may be coupled to odd-numbered right data lines RDL1, RDL3, . . . among the first through K-th right data lines RDL1, RDL2, RDL3, RDL4, . . . , RDLK, even-numbered sub-pixels (e.g., SP12, SP14 and SP1K) among the sub-pixels (e.g., SP11 through SP1K) coupled to the odd-numbered scan line (e.g., the first scan line SL1) may be coupled to even-numbered left data lines LDL2, LDL4, . . . , LDLK among the first through K-th left data lines LDL1, LDL2, LDL3, LDL4, . . . , LDLK, odd-numbered sub-pixels (e.g., SP21 and SP23, or SPL1 and SPL3) among sub-pixels (e.g., SP21 through SP2K. or SPL1 through SPLK) coupled to an even-numbered scan line (e.g., a second scan line SL2 or an L-th scan line SLL) may be coupled to odd-numbered left data lines LDL1, LDL3, . . . among the first through K-th left data lines LDL1, LDL2, LDL3, LDL4, . . . , LDLK, and even-numbered sub-pixels (e.g., SP22, SP24 and SP2K, or SPL2, SPL4 and SPLK among the sub-pixels (e.g., SP21 through SP2K. or SPL1 through SPLK) coupled the even-numbered scan line (e.g., the second scan line SL2 or the L-th scan line SLL) may be coupled to even-numbered right data lines RDL2, RDL4, . . . , RDLK among the first through K-th right data lines RDL1, RDL2, RDL3, RDL4, . . . , RDLK.

As described above, since two data lines (e.g., LDL1 and RDL1) are disposed in each sub-pixel column (e.g., SPC1), and the sub-pixels SP11 through SPLK are alternately coupled to the left data lines LDL1, LDL2, LDL3, LDL4, . . . , LDLK and the right data lines RDL1, RDL2, RDL3, RDL4, . . . , RDLK according to the sub-pixel column direction and according to the sub-pixel row direction, a data voltage of a data line (e.g., RDL1) coupled to a sub-pixel (e.g., SP11) in a current row may be maintained while a data voltage is applied through another data line (e.g., LDL1) to a sub-pixel (e.g., SP21) in the next row. Accordingly, the threshold voltage compensation time greater than or equal to one horizontal time (or 1H time) may be sufficiently secured.

The scan driver 130 may sequentially drive the plurality of scan lines SL1 through SLL based on a scan control signal SCS received from the controller 170. In some exemplary embodiments, the scan control signal SCS may include, but not be limited to, a start signal and an input clock signal.

The data driver 150 may provide the data voltages to the plurality of sub-pixels SP11 through SPLK based on a data control signal DCS and image data ODAT received from the controller 170. In some exemplary embodiments, the data control signal DCS may include, but not be limited to, a horizontal start signal and a load signal. The data driver 150 may include a plurality of source channels SC1, SC2, . . . , SCJ for respectively outputting the data voltages. Here, each source channel SC1, SC2, . . . , SCJ may mean an element of the data driver 150, a line for outputting the data voltage, or a combination of the element and the line.

In some exemplary embodiments, the number of the source channels SC1, SC2, . . . , SCJ in the data driver 150 may be less than the number of the sub-pixel columns SPC1 through SPCK in the display panel 110. For example, the display panel 110 may include the K sub-pixel columns SPC1 through SPCK, and the data driver 150 may include K/2 source channels SC1, SC2, . . . , SCJ. Thus, in this case, a ratio of the number of the source channels SC1, SC2, . . . , SCJ to the number of the sub-pixel columns SPC1 through SPCK may be, but not be limited to, 1:2. For example, the ratio of the number of the source channels SC1, SC2, . . . , SCJ to the number of the sub-pixel columns SPC1 through SPCK may be 1:3, 1:4, 1:5, 1:6, or an arbitrary ratio.

In some exemplary embodiments, in a case where the number of the source channels SC1, SC2, . . . , SCJ is less than the number of the sub-pixel columns SPC1 through SPCK, or in a case where the number of the source channels SC1, SC2, . . . , SCJ is less than the number of the data lines LDL1 through LDLK and RDL1 through RDLK, the display panel 110 may further include a demultiplexer circuit 120 that selectively couples the plurality of source channels SC1, SC2, . . . , SCJ of the data driver 150 to the plurality of data lines LDL1 through LDLK and RDL1 through RDLK in response to a demultiplexing (or demux) control signal DMCS received from the controller 170. For example, in a case where the number of the source channels SC1, SC2, . . . , SCJ is K/2, the number of the sub-pixel columns SPC1 through SPCK is K, and the number of the data lines LDL1 through LDLK and RDL1 through RDLK is 2K, the demultiplexer circuit 120 may couple the source channels SC1, SC2, . . . , SCJ to K/2 data lines of the 2K data lines LDL1 through LDLK and RDL1 through RDLK during a first portion of an odd-numbered scan on time in which the odd-numbered scan line (e.g., SL1) is driven, may couple the source channels SC1, SC2, . . . , SCJ to other K/2 data lines of the 2K data lines LDL1 through LDLK and RDL1 through RDLK during a second portion of the odd-numbered scan on time, may couple the source channels SC1, SC2, . . . , SCJ to still other K/2 data lines of the 2K data lines LDL1 through LDLK and RDL1 through RDLK during a first portion of an even-numbered scan on time in which the even-numbered scan line (e.g., SL2) is driven, and may couple the source channels SC1, SC2, . . . , SCJ to further still other K/2 data lines of the 2K data lines LDL1 through LDLK and RDL1 through RDLK during a second portion of the even-numbered scan on time.

The controller 170 (e.g., a timing controller) may receive input image data IDAT and a control signal CONT from an external host processor (e.g., a graphic processing unit (GPU), an application processor (AP), a graphic card, etc.). In some exemplary embodiments, the input image data IDAT may be RGB data including red image data, green image data and blue image data. Further, in some exemplary embodiments, the control signal CONT may include, but not be limited to, a vertical synchronization signal, a horizontal synchronization signal, a data enable signal, a master clock signal, etc. The controller 170 may control operations of the scan driver 130, the data driver 150 and/or the demultiplexer circuit 120 based on the control signal CONT and the input image data IDAT.

In some exemplary embodiments, the controller 170 may include a data converter 180 that converts an image format of the input image data IDAT, and a data remapper 190 that performs a data remapping operation on image data output from the data converter 180. For example, the display panel 110 may have an RGBG' pixel structure, and the data converter 180 may convert the input image data IDAT that are the RGB data into RGBG' data. Further, the data remapper 190 may generate the image data ODAT provided to the data driver 150 by performing the data remapping operation on the RGBG' data output from the data converter 180. In some exemplary embodiments, the data remapper 190 may output the RGBG' data for odd-numbered sub-pixel rows (e.g., sub-pixel rows coupled to SL1, . . . ) as it is, and may remap the RGBG' data for even-numbered sub-pixel rows (e.g., sub-pixel rows coupled to SL2, . . . , SLK). In other exemplary embodiments, the data remapper 190 may output the even-numbered sub-pixel rows as it is, and may remap the RGBG' data for the odd-numbered sub-pixel rows.

In the display device 100 according to exemplary embodiments, the sub-pixels SP11 through SPLK of the display panel 110 may be grouped into pixel groups such that each pixel group includes consecutive N sub-pixels, where N is an even number greater than or equal to 2. In some exemplary embodiments, the sub-pixels (e.g., SP11 through SP1K) coupled to the odd-numbered scan line (e.g., the first scan line SL1) may be alternately grouped into a first pixel group and a second pixel group. For example, sub-pixels coupled to the first scan line SL1 and located in first through N-th sub-pixel columns may be grouped into the first pixel group, sub-pixels coupled to the first scan line SL1 and located in (N+1)-th through 2N-th sub-pixel columns may be grouped into the second pixel group, sub-pixels coupled to the first scan line SL1 and located in (2N+1)-th through 3N-th sub-pixel columns may be grouped again into the first pixel group, and sub-pixels coupled to the first scan line SL1 and located in (3N+1)-th through 4N-th sub-pixel columns may be grouped again into the second pixel group. The first pixel groups and the second pixel groups may be sequentially driven during an odd-numbered scan on time in which the odd-numbered scan line (e.g., SL1) is driven. For example, during a first portion of the odd-numbered scan on time, the demultiplexer circuit 120 may couple the source channels SC1, SC2, . . . , SCJ to data lines coupled to the sub-pixels of the first pixel groups, and the data driver 150 may substantially simultaneously drive the first pixel groups. Thereafter, during a second portion of the odd-numbered scan on time, the demultiplexer circuit 120 may couple the source channels SC1, SC2, . . . , SCJ to data lines coupled to the sub-pixels of the second pixel groups, and the data driver 150 may substantially simultaneously drive the second pixel groups. Here, driving each pixel group may mean writing the data voltages to the sub-pixels of the pixel group such that the sub-pixels emit light.

Further, the sub-pixels (e.g., SP21 through SP2K) coupled to the even-numbered scan line (e.g., the second scan line SL2) may be alternately grouped into a third pixel group and a fourth pixel group. For example, sub-pixels coupled to the second scan line SL2 and located in the first through N-th sub-pixel columns may be grouped into the third pixel group, sub-pixels coupled to the second scan line SL2 and located in the (N+1)-th through 2N-th sub-pixel columns may be grouped into the fourth pixel group, sub-pixels coupled to the second scan line SL2 and located in the (2N+1)-th through 3N-th sub-pixel columns may be grouped again into the third pixel group, and sub-pixels coupled to the second scan line SL2 and located in the (3N+1)-th through 4N-th sub-pixel columns may be grouped again into the fourth pixel group. Consecutive N−1 sub-pixels among the sub-pixels of each third pixel group and one sub-pixel among the sub-pixels of each fourth pixel group may be driven during a first portion of an even-numbered scan on time in which the even-numbered scan line (e.g., SL2) is driven, and consecutive N−1 sub-pixels among the sub-pixels of each fourth pixel group and one sub-pixel among the sub-pixels of each third pixel group may be driven during a second portion of the second scan on time. Accordingly, in the display device 100 according to exemplary embodiments, a coupling between the data lines LDL1 through LDLK and RDL1 through RDLK may be prevented without a dummy source channel. Preventing the coupling without the dummy source channel according to exemplary embodiments will be described below with reference to FIGS. 2 through 4.

Figure 2:
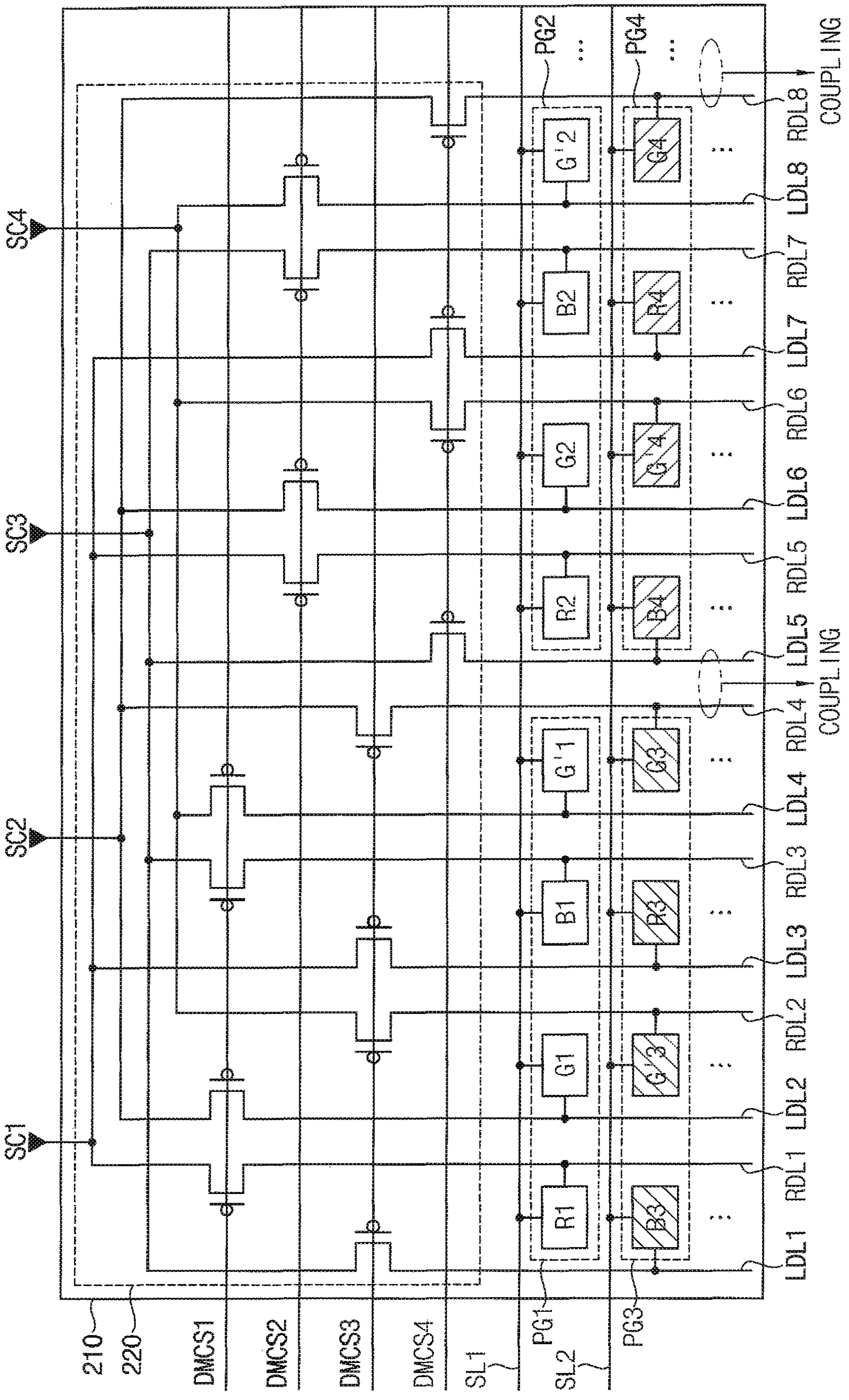
FIG. 2 is a diagram illustrating an example of a display panel where a demultiplexing (or demux) driving scheme is employed and two data lines are disposed in each sub-pixel column.
Figure 3A:
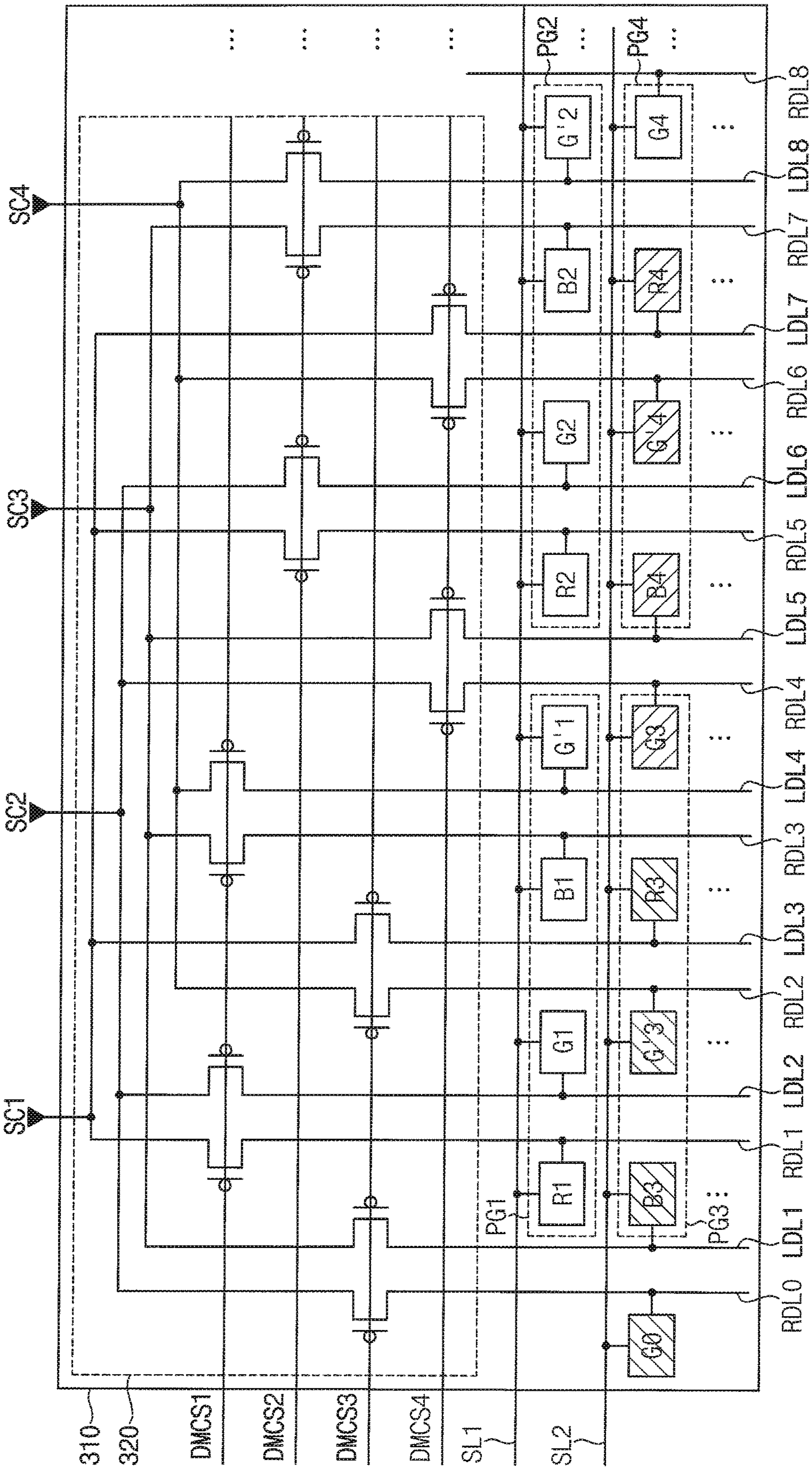
FIGS. 3A and 3B are diagrams illustrating an example of a display panel where a sub-pixel shift scheme is employed to prevent a coupling between data lines.
Figure 3B:
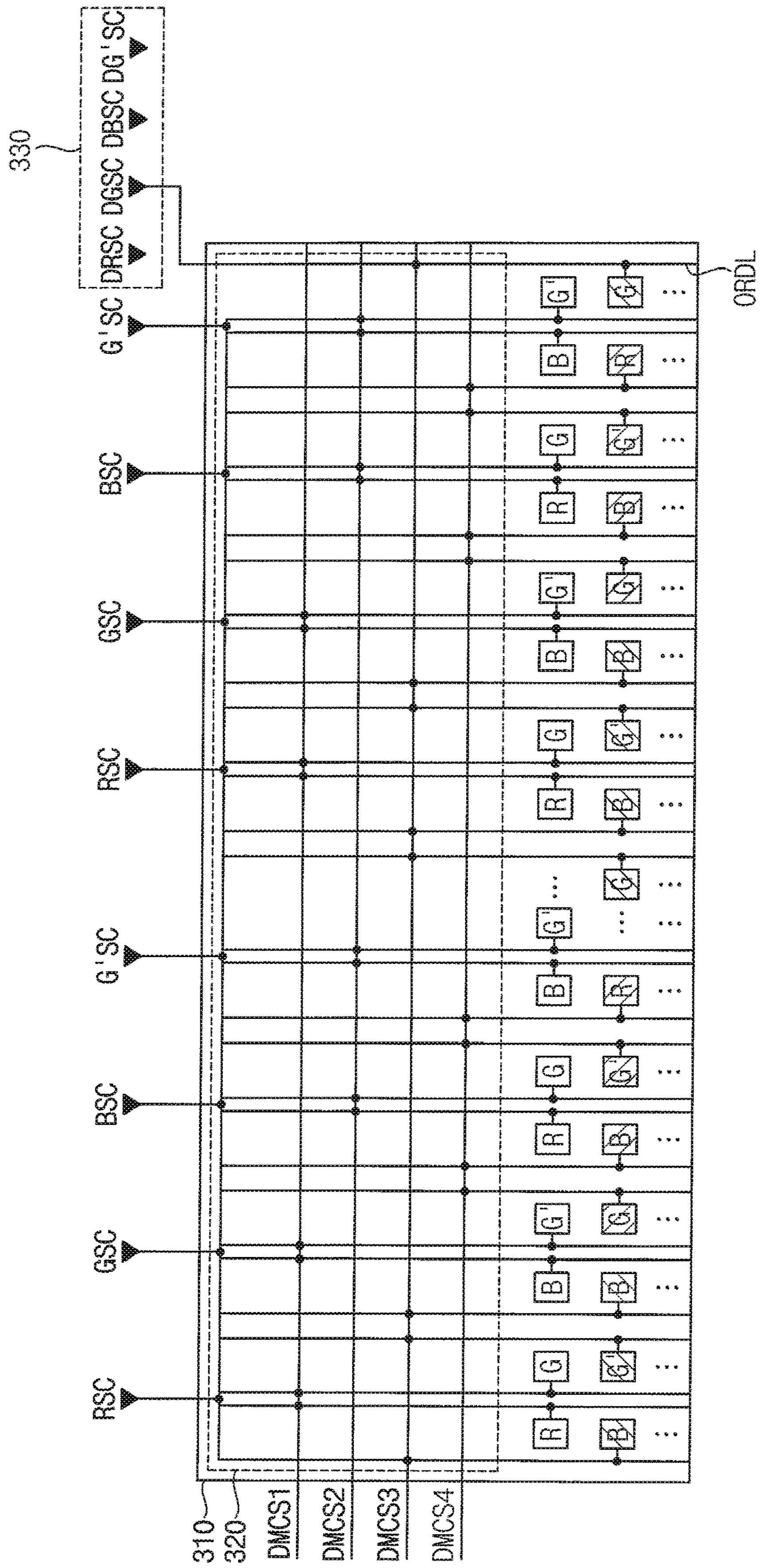
Figure 4:
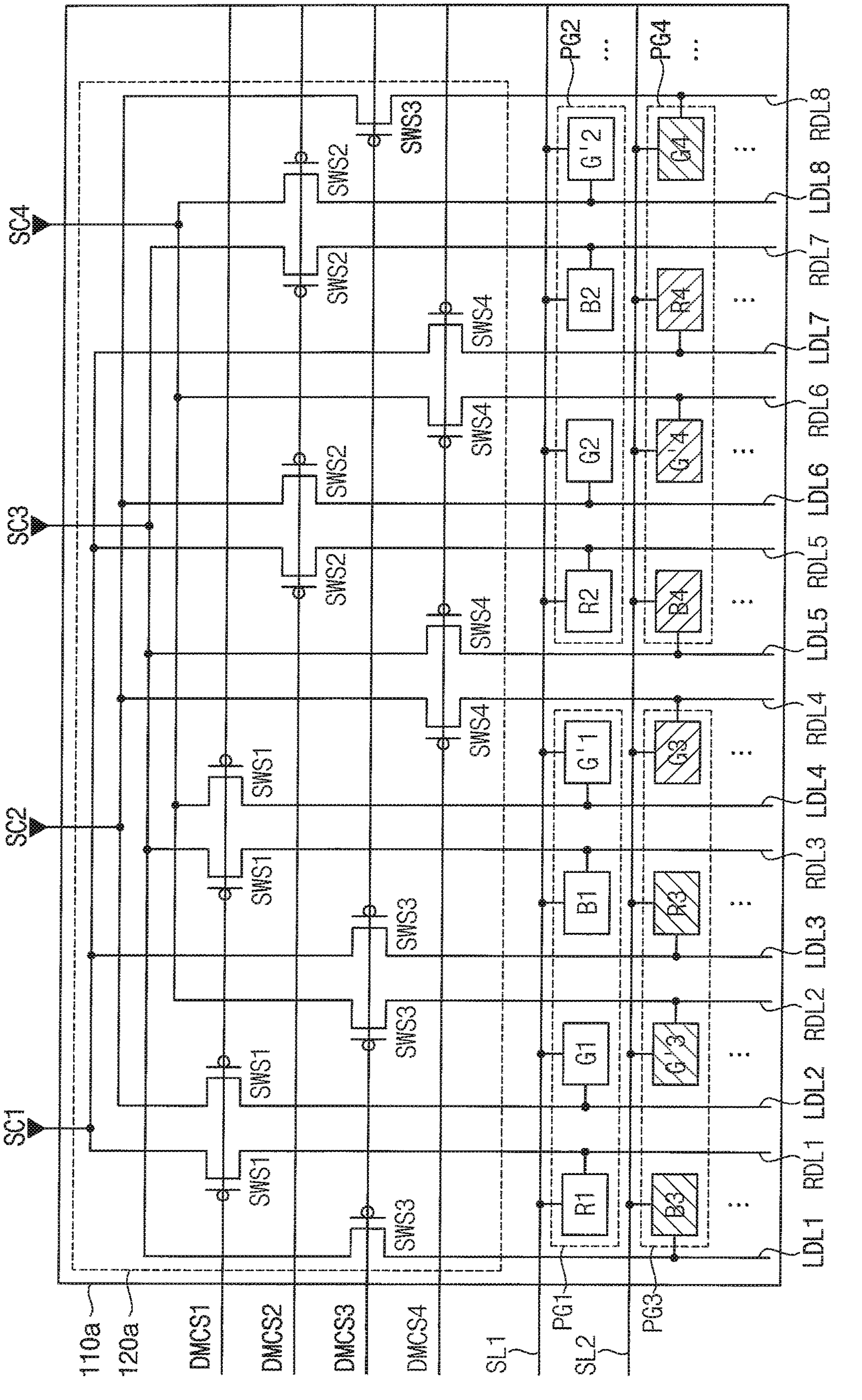
FIG. 4 is a diagram illustrating a display panel according to exemplary embodiments.

FIG. 2 is a diagram illustrating an example of a display panel where a demultiplexing (or demux) driving scheme is employed and two data lines are disposed in each sub-pixel column, FIGS. 3A and 3B are diagrams illustrating an example of a display panel where a sub-pixel shift scheme is employed to prevent a coupling between data lines, and FIG. 4 is a diagram illustrating a display panel according to exemplary embodiments.

FIG. 2 illustrates a display panel 210 having an RGBG' pixel structure where a 2:1 demultiplexing (or demux) driving scheme that drives two sub-pixel columns using one source channel SC1, SC2, SC3 and SC4 is employed, and two data lines LDL1 through LDL8 and RDL1 through RDL8 are disposed in each sub-pixel column. Referring to FIG. 2, sub-pixels of the display panel 210 may be grouped into pixel groups PG1, PG2, PG3 and PG4 each including consecutive four sub-pixels. For example, sub-pixels in an odd-numbered row (e.g., a row corresponding to SL1) may be alternately grouped into first pixel groups PG1 and second pixel groups PG2, and sub-pixels in an even-numbered row (e.g., a row corresponding to SL2) may be alternately grouped into third pixel groups PG3 and fourth pixel groups PG4.

During a first portion of a first scan on time in which a first scan line SL1 is driven, a demultiplexer circuit 220 may couple first through fourth source channels SC1, SC2, SC3 and SC4 to a first right data line RDL1, a second left data line LDL2, a third right data line RDL3 and a fourth left data line LDL4 in response to a first demux control signal DMCS1, and the first pixel groups PG1 coupled to the first scan line SL1 may be driven. Further, during a second portion of the first scan on time, the demultiplexer circuit 220 may couple the first through fourth source channels SC1, SC2, SC3 and SC4 to a fifth right data line RDL5, a sixth left data line LDL6, a seventh right data line RDL7 and an eighth left data line LDL8 in response to a second demux control signal DMCS2, and the second pixel groups PG2 coupled to the first scan line SL1 may be driven.

Thereafter, during a first portion of a second scan on time in which a second scan line SL2 is driven, the demultiplexer circuit 220 may couple the first through fourth source channels SC1, SC2, SC3 and SC4 to a first left data line LDL1, a second right data line RDL2, a third left data line LDL3 and a fourth right data line RDL4 in response to a third demux control signal DMCS3, and the third pixel groups PG2 coupled to the second scan line SL2 may be driven. Further, during a second portion of the second scan on time, the demultiplexer circuit 220 may couple the first through fourth source channels SC1, SC2, SC3 and SC4 to a fifth left data line LDL5, a sixth right data line RDL6, a seventh left data line LDL7 and an eighth right data line RDL8 in response to a fourth demux control signal DMCS4, and the fourth pixel groups PG4 coupled to the second scan line SL2 may be driven.

In this case, since a data voltage is applied to the fifth left data line LDL5 adjacent to the fourth right data line RDL4 in the second portion of the second scan on time after a data voltage for G sub-pixel G3 of the third pixel group PG3 is applied to the fourth right data line RDL4 in the first portion of the second scan on time, the data voltage of the fourth right data line RDL4 may be changed or distorted by a coupling between the fourth right data line RDL4 and the fifth left data line LDL5. Accordingly, the G sub-pixel G3 of the third pixel group PG3 may not emit light with desired luminance. Further, this coupling phenomenon may occur between the eighth right data line RDL8 and the next left data line. That is, the coupling phenomenon may occur in a case where data lines disposed between adjacent sub-pixel columns are driven at different timings.

To prevent the coupling phenomenon occurring in the display panel 210 of FIG. 2, as illustrated in FIGS. 3A and 3B, one sub-pixel shift scheme may be applied with respect to one sub-pixel row per two sub-pixel rows. Referring to FIG. 3A, sub-pixels in the even-numbered row (e.g., the row corresponding to SL2) may be shifted by one sub-pixel.

For example, as illustrated in FIG. 3A, during the first portion of the second scan on time in which the second scan line SL2 is driven, a demultiplexer circuit 320 may couple the first through fourth source channels SC1, SC2, SC3 and SC4 to a 0-th right data line RDL0 located at a left side of the first left data line LDL1, the first left data line LDL1, the second right data line RDL2 and the third left data line LDL3 in response to the third demux control signal DMCS3, and G sub-pixel G0 located at a left side of each third pixel group PG3 and three sub-pixels B3, G'3 and R3 of each third pixel group PG3 may be driven. During the second portion of the second scan on time, the demultiplexer circuit 320 may couple the first through fourth source channels SC1, SC2, SC3 and SC4 to the fourth right data line RDL4, the fifth left data line LDL5, the sixth right data line RDL6 and the seventh left data line LDL7 in response to the fourth demux control signal DMCS4, and one sub-pixel G3 of each third pixel group PG3 and three sub-pixels B4, G'4 and R4 of each fourth pixel group PG4 may be driven.

Accordingly, since data lines disposed between adjacent sub-pixel columns may be substantially simultaneously driven, image quality degradation caused by the coupling between the data lines may be prevented. However, in the case where the left sub-pixel shift scheme where the sub-pixels are shifted by one sub-pixel to the left is applied as illustrated in FIG. 3A, as illustrated in FIG. 3B, the outermost right data line ORDL should be coupled to a dummy source channel 330. Thus, referring to FIG. 3B, a data driver for driving the display panel 310 should include not only source channels RSC, GSC, BSC and G'SC of which the number correspond to a half of the number of sub-pixel columns, but also at least one dummy source channel DRSC, DGSC, DBSC and DG'SC.

To address the problem that the dummy source channel DRSC, DGSC, DBSC and DG'SC should be added in the display panel 310 of FIGS. 3A and 3B, in a display panel 110*a* according to exemplary embodiments, as illustrated in FIG. 4, three sub-pixels B3, G'3 and R3 of the third pixel group PG3 and one sub-pixel G4 of the fourth pixel group PG4 spaced apart from the three sub-pixels B3, G'3 and R3 may be substantially simultaneously driven. In this case, since four source channels SC1, SC2, SC3 and SC4 drive all of eight sub-pixel columns, the additional dummy source channel DRSC, DGSC, DBSC and DG'SC may not be required. Further, since the data lines located between the adjacent sub-pixel columns are substantially simultaneously driven in the display panel 110*a* of FIG. 4, the image quality degradation caused by the coupling between the data lines may be prevented. Thus, in the display panel 110*a* according to exemplary embodiments, the coupling between the data lines may be prevented without the dummy source channel.

Referring to FIG. 4, a display panel 110*a* may include a first pixel group PG1 including sub-pixels R1, G1, B1 and G'1 coupled to a first scan line SL1 and located in first through fourth sub-pixel columns, a second pixel group PG2 including sub-pixels R2, G2, B2 and G'2 coupled to the first scan line SL1 and located in fifth through eighth sub-pixel columns, a third pixel group PG3 including sub-pixels B3, G'3, R3 and G3 coupled to a second scan line SL2 adjacent to the first scan line SL1 and located in the first through fourth sub-pixel columns, and a fourth pixel group PG4 including sub-pixels B4, G'4, R4 and G4 coupled to the second scan line SL2 and located in the fifth through eighth sub-pixel columns. For example, as illustrated in FIG. 4, the first pixel group PG may include a first R sub-pixel R1, a first G sub-pixel G1, a first B sub-pixel B1 and a first G' sub-pixel G' 1 respectively located in the first through fourth sub-pixel columns, the second pixel group PG2 may include a second R sub-pixel R2, a second G sub-pixel G2, a second B sub-pixel B2 and a second G' sub-pixel G'2 respectively located in the fifth through eighth sub-pixel columns, the third pixel group PG3 may include a third B sub-pixel B3, a third G' sub-pixel G'3, a third R sub-pixel R3 and a third G sub-pixel G3 respectively located in the first through fourth sub-pixel columns, and the fourth pixel group PG4 may include a fourth B sub-pixel B4, a fourth G' sub-pixel G'4, a fourth R sub-pixel R4 and a fourth G sub-pixel G4 respectively located in the fifth through eighth sub-pixel columns.

Although FIG. 4 illustrates, for convenience of illustration, only sixteen sub-pixels located in eight sub-pixel columns and two sub-pixel rows, it would be understood that the display panel 110*a* include more than sixteen sub-pixels. Further, it would be understood that, along a direction of the sub-pixel row, four sub-pixels next to the second pixel group PG2 may be grouped into the first pixel group PG1, four sub-pixels next thereto may be grouped into the second pixel group PG2, four sub-pixels next to the fourth pixel group PG4 may be grouped into the third pixel group PG3, and four sub-pixels next thereto may be grouped into the fourth pixel group PG4. Further, it would be understood that other sub-pixels also may be disposed along a direction of the sub-pixel column, and the other sub-pixels also may be grouped similarly to the first through fourth pixel groups PG1, PG2, PG3 and PG4.

The display panel 110*a* may further include a plurality of data lines LDL1 through LDL8 and RDL1 through RDL8 such that two data lines of the plurality of data lines LDL1 through LDL8 and RDL1 through RDL8 may be disposed per sub-pixel column. In some exemplary embodiments, the display panel 110*a* may include first through eighth left data lines LDL1 through LDL8 disposed at left sides of the first through eighth sub-pixel columns, and first through eighth right data lines RDL1 through RDL8 disposed at right sides of the first through eighth sub-pixel columns.

Odd-numbered sub-pixels R1, B1, R2 and B2 among the sub-pixels R1, G1, B1, G'1, R2, G2, B2 and G'2 of the first and second pixel groups PG1 and PG2 coupled to the first scan line SL1 may be coupled to odd-numbered right data lines RDL1, RDL3, RDL5 and RDL7 among the first through eighth right data lines RDL1 through RDL8, and even-numbered sub-pixels G1, G'1, G2 and G'2 among the sub-pixels R1, G1, B1, G'1, R2, G2, B2 and G'2 of the first and second pixel groups PG1 and PG2 coupled to the first scan line SL1 may be coupled to even-numbered left data lines LDL2, LDL4, LDL6 and LDL8 among the first through eighth left data lines LDL1 through LDL8. Further, odd-numbered sub-pixels B3, R3, B4 and R4 among the sub-pixels B3, G'3, R3, G3, B4, G'4, R4 and G4 of the third and fourth pixel groups PG3 and PG4 coupled to the second scan line SL2 may be coupled to odd-numbered left data lines LDL1, LDL3, LDL5 and LDL7 among the first through eighth left data lines LDL1 through LDL8, and even-numbered sub-pixels G'3, G3, G'4 and G4 among the sub-pixels B3, G'3, R3, G3, B4, G'4, R4 and G4 of the third and fourth pixel groups PG3 and PG4 coupled to the second scan line SL2 may be coupled to even-numbered right data lines RDL2, RDL4, RDL6 and RDL8 among the first through eighth right data lines RDL1 through RDL8.

The display panel 110*a* may further include a demultiplexer circuit 120*a* that couples four source channels SC1, SC2, SC3 and SC4 to four data lines selected from among the first through eighth left data lines LDL1 through LDL8 and the first through eighth right data lines RDL1 through RDL8. The demultiplexer circuit 120*a* may couple the source channels SC1, SC2, SC3 and SC4 to data lines RDL1, LDL2, RDL3 and LDL4 coupled to the first pixel group PG1, may couple the source channels SC1, SC2, SC3 and SC4 to data lines RDL5, LDL6, RDL7 and LDL8 coupled to the second pixel group PG2, may couple the source channels SC1, SC2, SC3 and SC4 to data lines LDL1, RDL2, LDL3 and RDL8 coupled to three sub-pixels B3, G'3 and R3 of the third pixel group PG3 and one sub-pixel G4 of the fourth pixel group PG4, or may couple the source channels SC1, SC2, SC3 and SC4 to data lines RDL4, LDL5, RDL6 and LDL7 coupled to the remaining one sub-pixel G3 of the third pixel group PG3 and the remaining three sub-pixels B4, G'4 and R4 of the fourth pixel group PG4.

To perform this operation, as illustrated in FIG. 4, the demultiplexer circuit 120*a* may include first demux switches SWS1 that couple the four source channels SC1, SC2, SC3 and SC4 to the even-numbered left data lines LDL2 and LDL4 among the first through fourth left data lines LDL1 through LDL4 and the odd-numbered right data lines RDL1 and RDL3 among the first through fourth right data lines RDL1 through RDL4 in response to the first demux control signal DMCS1, second demux switches SWS2 that couple the four source channels SC1, SC2, SC3 and SC4 to the even-numbered left data lines LDL6 and LDL8 among the fifth through eighth left data lines LDL5 through LDL8 and the odd-numbered right data lines RDL5 and RDL7 among the fifth through eighth right data lines RDL5 through RDL8 in response to the second demux control signal DMCS2, third demux switches SWS3 that couple the four source channels SC1, SC2, SC3 and SC4 to the odd-numbered left data lines LDL1 and LDL3 among the first through third and eighth left data lines LDL1 through LDL3 and LDL8 and the even-numbered right data lines RDL2 and RDL8 among the first through third and eighth right data lines RDL1 through RDL3 and RDL8 in response to the third demux control signal DMCS3, and fourth demux switches SWS4 that couple the four source channels SC1, SC2, SC3 and SC4 to the odd-numbered left data lines LDL5 and LDL7 among the fourth through seventh left data lines LDL4 through LDL7 and the even-numbered right data lines RDL4 and RDL6 among the fourth through seventh right data lines RDL4 through RDL7 in response to the fourth demux control signal DMCS4.

In the display panel 110*a* having this structure, during the first scan on time in which the first scan line SL1 is driven, the first pixel group PG1 and the second pixel group PG2 may be sequentially driven. Further, consecutive three sub-pixels B3, G'3 and R3 among the sub-pixels B3, G'3, R3 and G3 of the third pixel group PG3 and one sub-pixel G4 among the sub-pixels B4, G'4, R4 and G4 of the fourth pixel group PG4 may be driven during the first portion of the second scan on time in which the second scan line SL2 is driven, and consecutive three sub-pixels B4, G'4 and R4 among the sub-pixels B4, G'4, R4 and G4 of the fourth pixel group PG4 and one sub-pixel G3 among the sub-pixels B3, G'3, R3 and G3 of the third pixel group PG3 may be driven during the second portion of the second scan on time. Hereinafter, an operation of the display panel 110*a* will be described in detail below with reference to FIGS. 5 through 7D.

Figure 5:
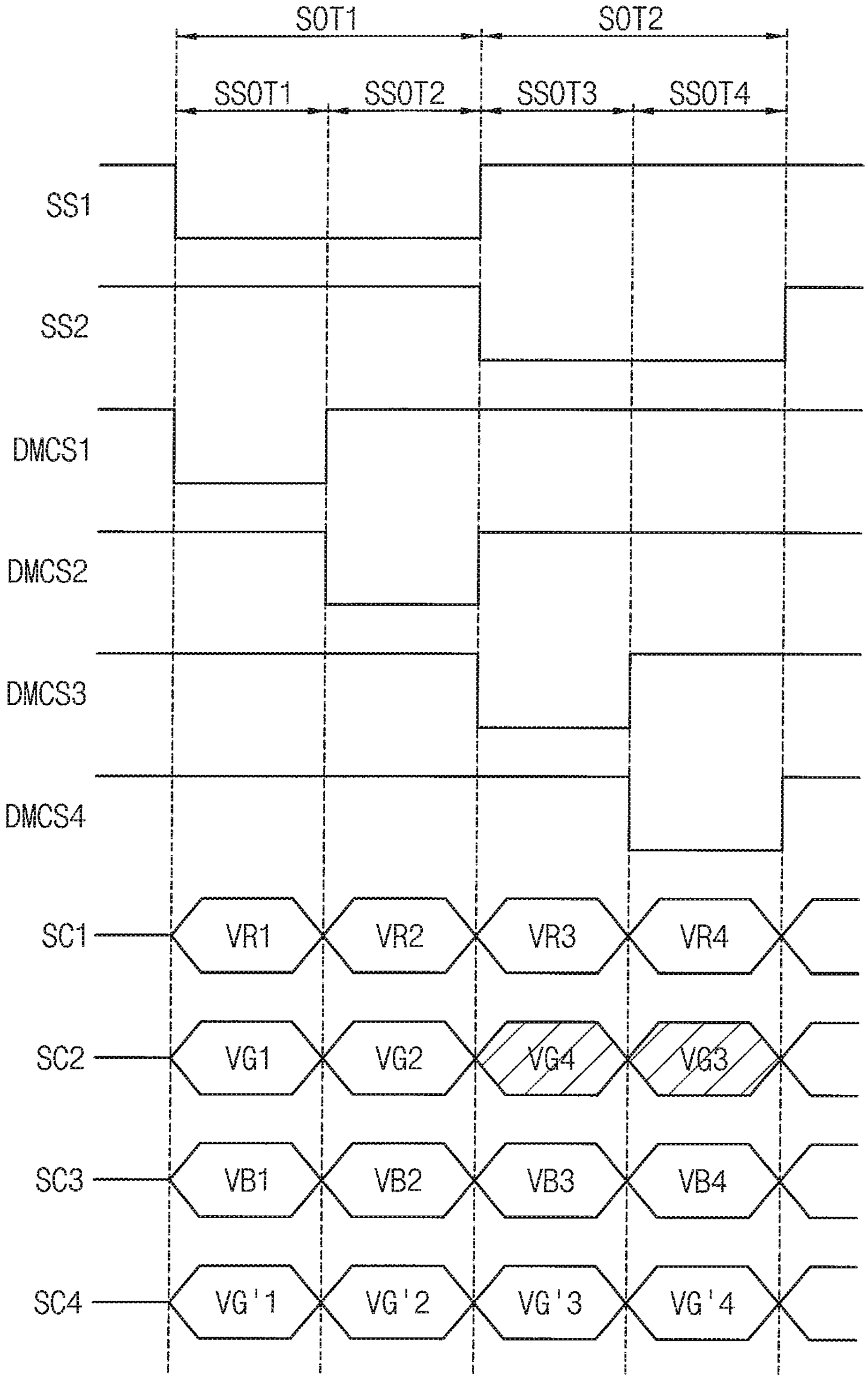
FIG. 5 is a timing diagram for describing an operation of a display panel of FIG. 4.

FIG. 5 is a timing diagram for describing an operation of a display panel of FIG. 4, FIG. 6 is a diagram for describing a remapping operation for image data provided to a display panel of FIG. 4, and FIGS. 7A through 7D are diagrams for describing an operation of a display panel of FIG. 4 during first through fourth sub-scan on times.

Referring to FIGS. 4 and 5, a first scan on time SOT1 in which a first scan signal SS1 is applied to a first scan line SL1 may be divided into a first sub-scan on time SSOT1 and a second sub-scan on time SSOT2.

Figure 7A:
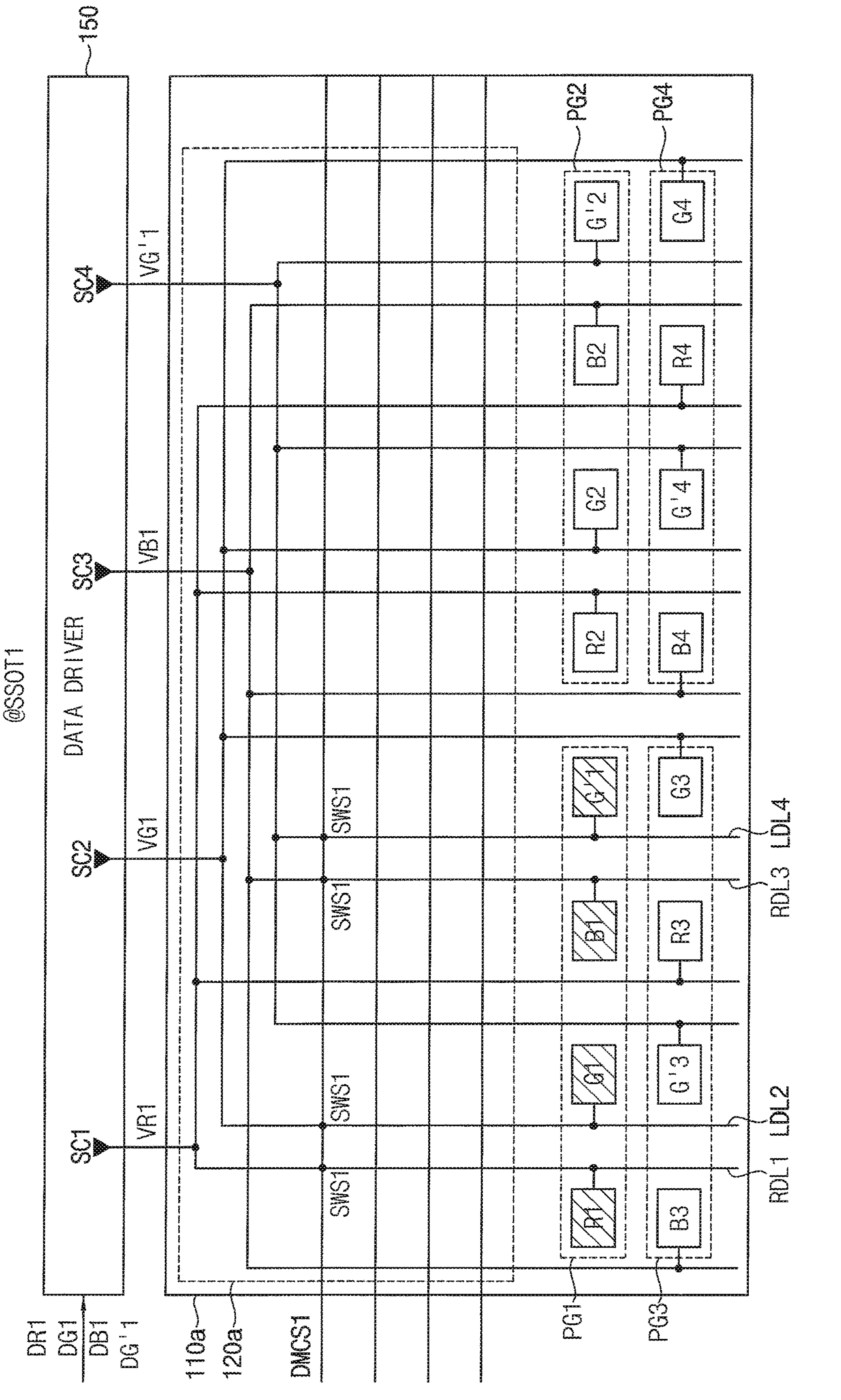
FIGS. 7A through 7D are diagrams for describing an operation of a display panel of FIG. 4 during first through fourth sub-scan on times.

During the first sub-scan on time SSOT1, as illustrated in FIG. 7A, a data driver 150 may receive image data DR1, DG1, DB1 and DG'1 for sub-pixels R1, G1, B1 and G'1 of a first pixel group PG1 from a controller 170 of FIG. 1, and may output data voltages VR1, VG1, VB1 and VG'1 corresponding to the image data DR1, DG1, DB1 and DG'1 through source channels SC1, SC2, SC3 and SC4. A demultiplexer circuit 120*a* may receive a first demux control signal DMCS1 from the controller 170 of FIG. 1, and first demux switches SWS1 may be turned on in response to the first demux control signal DMCS1. The first demux switches SWS1 may couple the source channels SC1, SC2, SC3 and SC4 to data lines RDL1, LDL2, RDL3 and LDL4 coupled to the sub-pixels R1, G1, B1 and G'1 of the first pixel group PG1. Accordingly, in the first sub-scan on time SSOT1, the data voltages VR1, VG1, VB1 and VG'1 may be applied to the sub-pixels R1, G1, B1 and G'1 of the first pixel group PG1, and thus a first R sub-pixel R1, a first G sub-pixel G1, a first B sub-pixel B1 and a first G' sub-pixel G'1 of the first pixel group PG1 located in first through fourth sub-pixel columns may be driven.

Figure 7B:
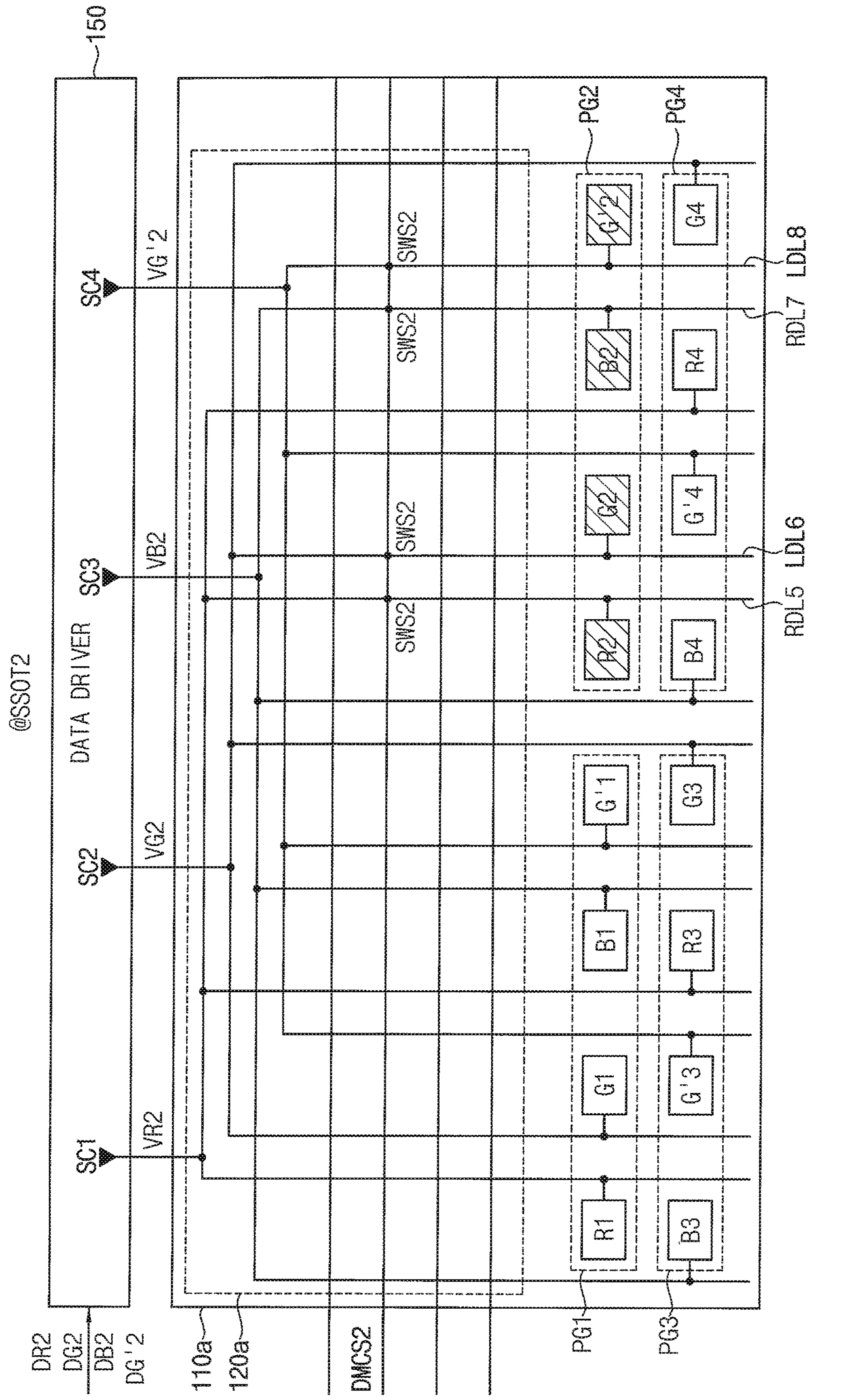

During the second sub-scan on time SSOT2, as illustrated in FIG. 7B, the data driver 150 may receive image data DR2, DG2, DB2 and DG'2 for sub-pixels R2, G2, B2 and G'2 of a second pixel group PG2 from the controller 170 of FIG. 1, and may output data voltages VR2, VG2, VB2 and VG'2 corresponding to the image data DR2, DG2, DB2 and DG'2 through the source channels SC1, SC2, SC3 and SC4. The demultiplexer circuit 120*a* may receive a second demux control signal DMCS2 from the controller 170 of FIG. 1, and second demux switches SWS2 may be turned on in response to the second demux control signal DMCS2. The second demux switches SWS2 may couple the source channels SC1, SC2, SC3 and SC4 to data lines RDL5, LDL6, RDL7 and LDL8 coupled to the sub-pixels R2, G2, B2 and G'2 of the second pixel group PG2. Accordingly, in the second sub-scan on time SSOT2, the data voltages VR2, VG2, VB2 and VG'2 may be applied to the sub-pixels R2, G2, B2 and G'2 of the second pixel group PG2, and thus a second R sub-pixel R2, a second G sub-pixel G2, a second B sub-pixel B2 and a second G' sub-pixel G'2 located in fifth through eighth sub-pixel columns may be driven.

A second scan on time SOT2 in which a second scan signal SS2 is applied to a second scan line SL2 may be divided into a third sub-scan on time SSOT3 and a fourth sub-scan on time SSOT4.

Three sub-pixels B3, G'3 and R3 of a third pixel group PG3 and one sub-pixel G4 of a fourth pixel group PG4 may be driven in the third sub-scan on time SSOT3, and three sub-pixels B4, G'4 and R4 of the fourth pixel group PG4 and one sub-pixel G3 of the third pixel group PG3 may be driven in the fourth sub-scan on time SSOT4. A data converter 180 of FIG. 1 may convert input image data IDAT that are RGB data into RGBG' data suitable for the display panel 110*a* having the RGBG' pixel structure. However, as illustrated in a table 410 of FIG. 6, the data converter 180 may output RGBG' data DR3, DG3, DB3 and DG'3 for sub-pixels B3, G'3, R3 and G3 of the third pixel group PG3 in the third sub-scan on time SSOT3, and may output RGBG' data DR4, DG4, DB4 and DG'4 for sub-pixels B4, G'4, R4 and G4 of the fourth pixel group PG4 in the fourth sub-scan on time SSOT4. A data remapper 190 of FIG. 1 may remap the RGBG' data for the third pixel group PG3 and the fourth pixel group PG4 such that the one sub-pixel G4 of the fourth pixel group PG4 may be driven in the third sub-scan on time SSOT3 and the one sub-pixel G3 of the third pixel group PG3 may be driven in the fourth sub-scan on time SSOT4. For example, as illustrated in a table 430 of FIG. 6, the data remapper 190 may swap data DG3 for the one sub-pixel G3 of the third pixel group PG3 and data DG4 for the one sub-pixel G4 of the fourth pixel group PG4 in the RGBG' data.

Figure 7C:
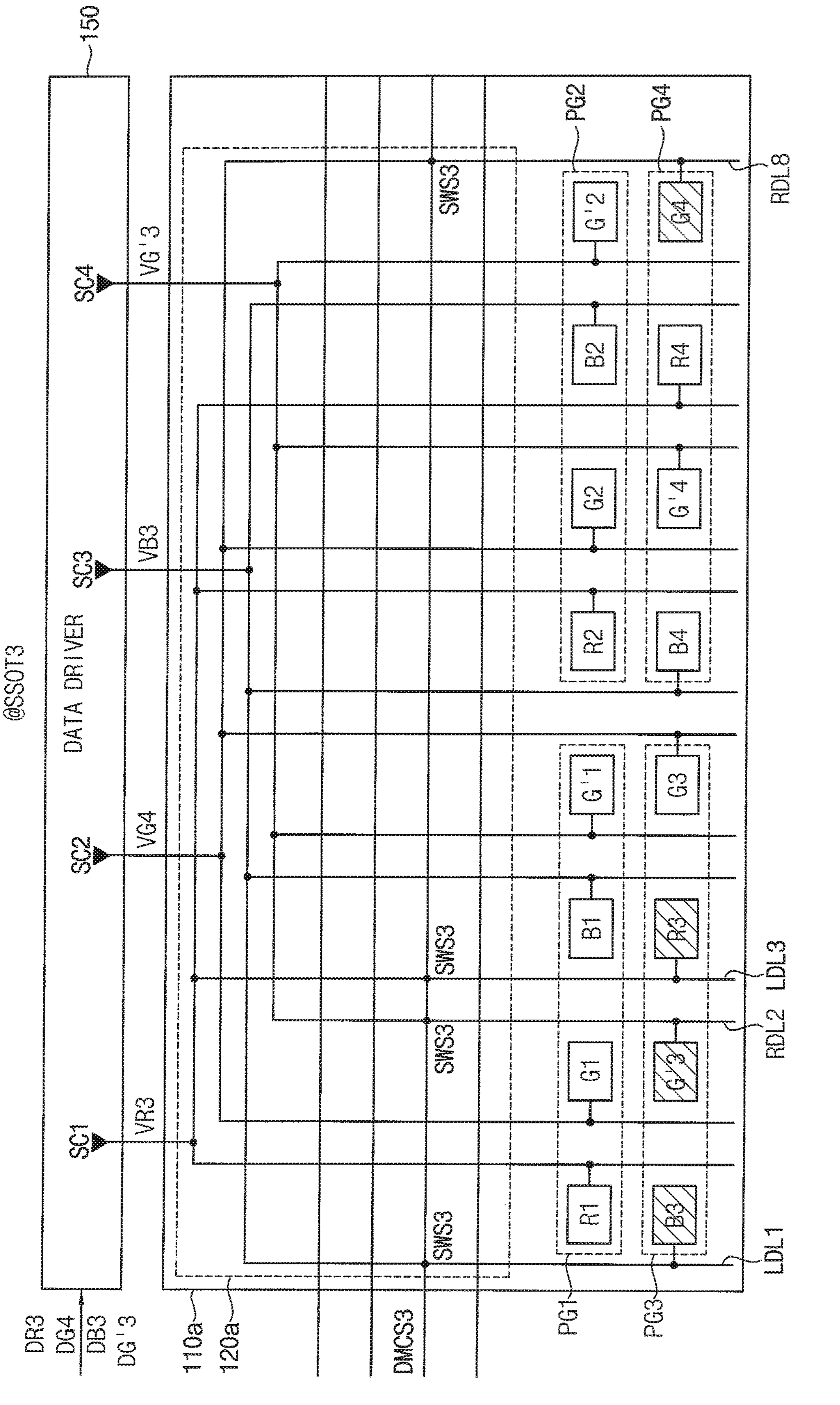

During the third sub-scan on time SSOT3, as illustrated in FIG. 7C, the data driver 150 may receive image data DR3, DG4, DB3 and DG'3 for the three sub-pixels B3, G'3 and R3 of the third pixel group PG3 and the one sub-pixel G4 of the fourth pixel group PG4 from the data remapper 190 of the controller 170 of FIG. 1, and may output data voltages VR3, VG4, VB3 and VG'3 corresponding to the image data DR3, DG4, DB3 and DG'3 through the source channels SC1, SC2, SC3 and SC4. The demultiplexer circuit 120*a* may receive a third demux control signal DMCS3 from the controller 170 of FIG. 1, and third demux switches SWS3 may be turned on in response to the third demux control signal DMCS3. The third demux switches SWS3 may couple the source channels SC1, SC2, SC3 and SC4 to data lines LDL1, RDL2, LDL3 and RDL8 coupled to the three sub-pixels B3, G'3 and R3 of the third pixel group PG3 and the one sub-pixel G4 of the fourth pixel group PG4. Accordingly, in the third sub-scan on time SSOT3, the data voltages VR3, VG4, VB3 and VG'3 may be applied to the three sub-pixels B3, G'3 and R3 of the third pixel group PG3 and the one sub-pixel G4 of the fourth pixel group PG4, and thus a third B sub-pixel B3, a third G' sub-pixel G'3 and a third R sub-pixel R3 of the third pixel group PG3 located in the first through third sub-pixel columns and a fourth G sub-pixel G4 of the fourth pixel group PG4 located in the eighth sub-pixel column may be driven.

Figure 7D:
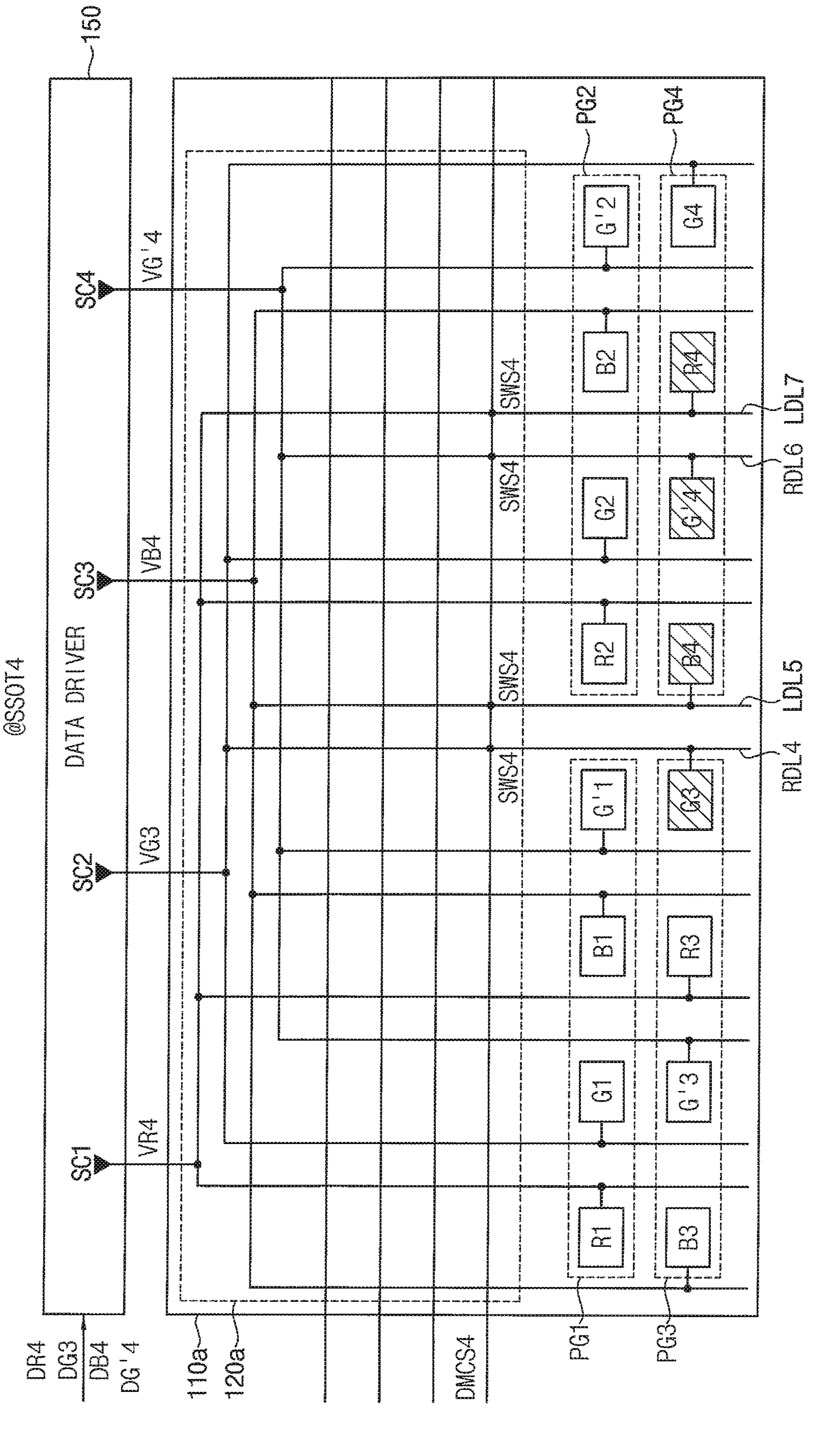

During the fourth sub-scan on time SSOT4, as illustrated in FIG. 7D, the data driver 150 may receive image data DR4, DG3, DB4 and DG'4 for the three sub-pixels B4, G'4 and R4 of the fourth pixel group PG4 and the one sub-pixel G3 of the third pixel group PG3 from the data remapper 190 of the controller 170 of FIG. 1, and may output data voltages VR4, VG3, VB4 and VG'4 corresponding to the image data DR4, DG3, DB4 and DG'4 through the source channels SC1, SC2, SC3 and SC4. The demultiplexer circuit 120*a* may receive a fourth demux control signal DMCS4 from the controller 170 of FIG. 1, and fourth demux switches SWS4 may be turned on in response to the fourth demux control signal DMCS4. The fourth demux switches SWS4 may couple the source channels SC1, SC2, SC3 and SC4 to data lines RDL4, LDL5, RDL6 and LDL7 coupled to the three sub-pixels B4, G'4 and R4 of the fourth pixel group PG4 and the one sub-pixel G3 of the third pixel group PG3. Accordingly, in the fourth sub-scan on time SSOT4, the data voltages VR4, VG3, VB4 and VG'4 may be applied to the three sub-pixels B4, G'4 and R4 of the fourth pixel group PG4 and the one sub-pixel G3 of the third pixel group PG3, and thus a fourth B sub-pixel B4, a fourth G' sub-pixel G'4 and a fourth R sub-pixel R4 of the fourth pixel group PG4 located in the fifth through seventh sub-pixel columns and a third G sub-pixel G3 of the third pixel group PG3 located in the fourth sub-pixel column may be driven.

Accordingly, since data lines between adjacent sub-pixel columns may be substantially simultaneously driven and all sub-pixels located in eight sub-pixel columns may be driven by four source channels SC1, SC2, SC3 and SC4, a coupling between the data lines may be prevented without a dummy source channel.

Figure 8:
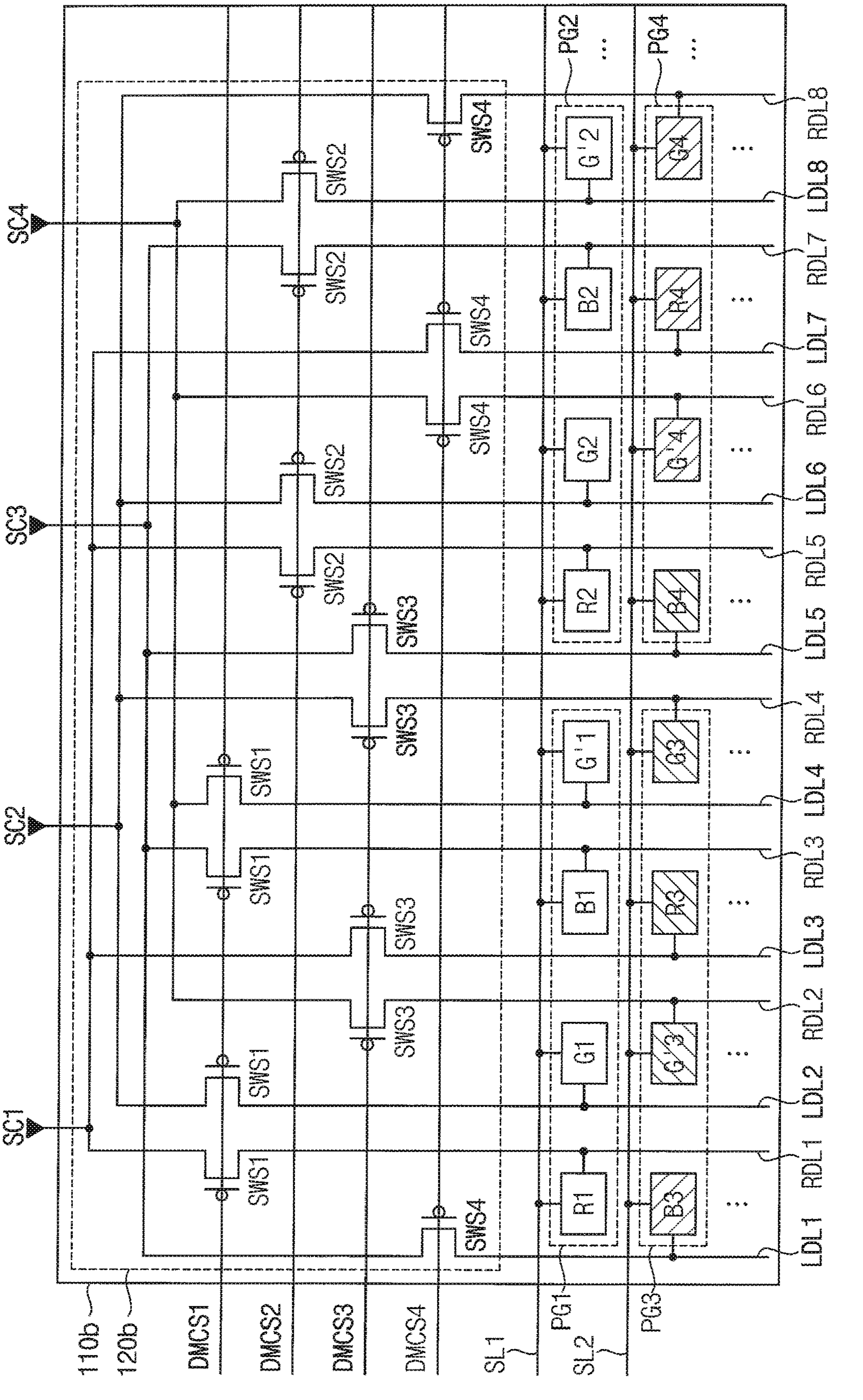
FIG. 8 is a diagram illustrating a display panel according to exemplary embodiments.
Figure 9:
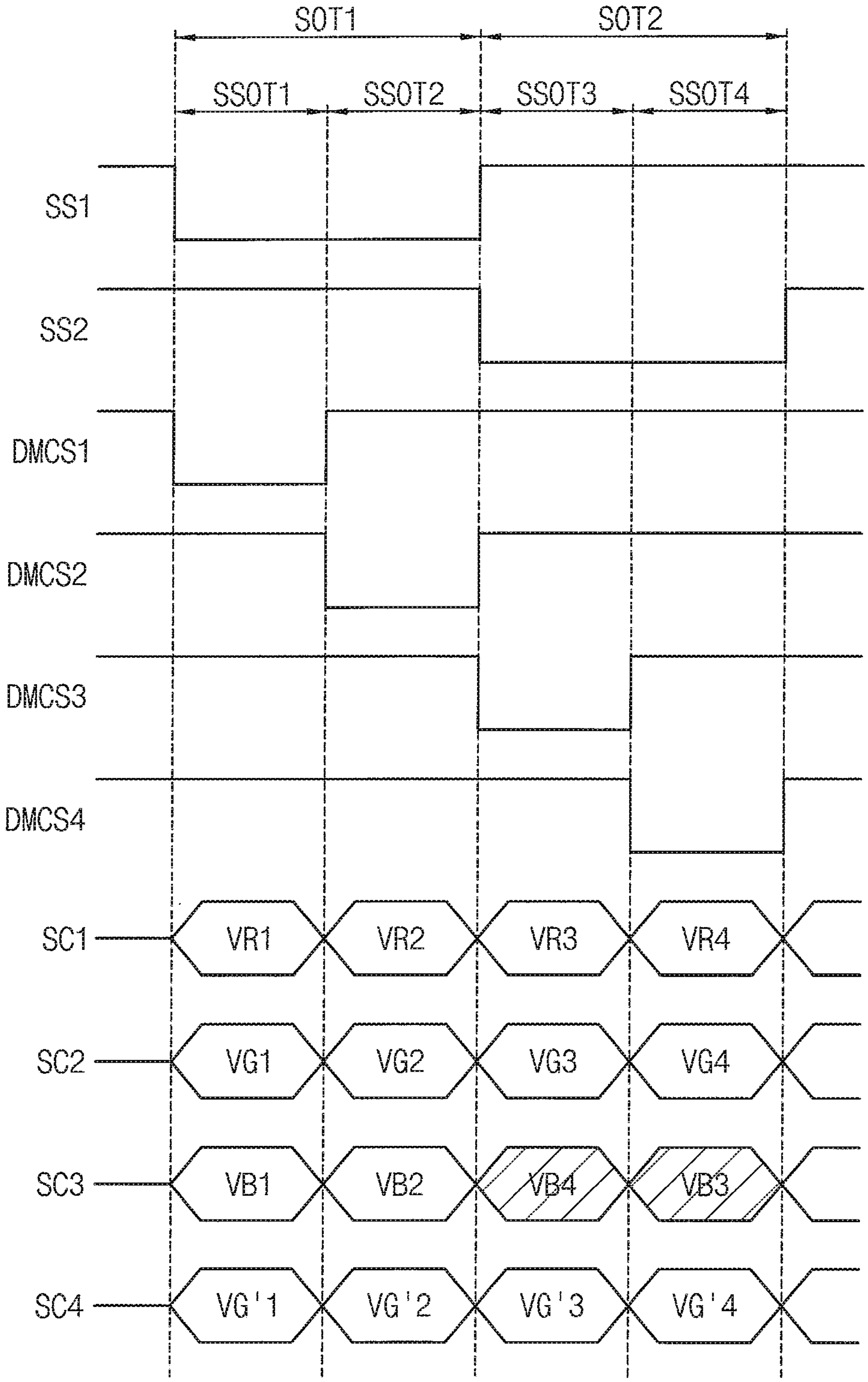
FIG. 9 is a timing diagram for describing an operation of a display panel of FIG. 8.

FIG. 8 is a diagram illustrating a display panel according to exemplary embodiments, FIG. 9 is a timing diagram for describing an operation of a display panel of FIG. 8, FIG. 10 is a diagram for describing a remapping operation for image data provided to a display panel of FIG. 8, and FIGS. 11A through 11D are diagrams for describing an operation of a display panel of FIG. 8 during first through fourth sub-scan on times.

A display panel 110*b* of FIG. 8 may have a similar configuration and a similar operation to a display panel 110*a* of FIG. 4, except that, unlike the display panel 110*a* in which a left sub-pixel shift scheme is applied, a right sub-pixel shift scheme is applied with respect to a sub-pixel row corresponding to a second scan line SL2. Referring to FIG. 8, the display panel 110*b* may include first through fourth pixel groups PG1, PG2, PG3 and PG4 and a demultiplexer circuit 120*b*.

The demultiplexer circuit 120*b* may include first demux switches SWS1, second demux switches SWS2, third demux switches SWS3 and fourth demux switches SWS4, and the first demux switches SWS1 and the second demux switches SWS2 of the demultiplexer circuit 120*b* may be substantially the same as the first demux switches SWS1 and the second demux switches SWS2 of the demultiplexer circuit 120*a* of FIG. 4.

The third demux switches SWS3 of the demultiplexer circuit 120*b* may couple four source channels SC1, SC2, SC3 and SC4 to odd-numbered left data lines LDL3 and LDL5 among second through fifth left data lines LDL2 through LDL5 and even-numbered right data lines RDL2 and RDL4 among second through fifth right data lines RDL2 through RDL5 in response to a third demux control signal DMCS3. Further, the fourth demux switches SWS4 of the demultiplexer circuit 120*b* may couple the four source channels SC1, SC2, SC3 and SC4 to odd-numbered left data lines LDL1 and LDL7 among first and sixth through eighth left data lines LDL1 and LDL6 through LDL8 and even-numbered right data lines RDL6 and RDL8 among first and sixth through eighth right data lines RDL1 and RDL6 through RDL8 in response to a fourth demux control signal DMCS4.

Referring to FIGS. 1 and 8 through 11D, a first scan on time SOT1 in which a first scan signal SS1 is applied to a first scan line SL1 may be divided into a first sub-scan on time SSOT1 and a second sub-scan on time SSOT2. During the first sub-scan on time SSOT1, as illustrated in FIG. 11A, a first R sub-pixel R1, a first G sub-pixel G1, a first B sub-pixel B1 and a first G' sub-pixel G' 1 of the first pixel group PG1 located in first through fourth sub-pixel columns may be driven. During the second sub-scan on time SSOT2, as illustrated in FIG. 11B, a second R sub-pixel R2, a second G sub-pixel G2, a second B sub-pixel B2 and a second G' sub-pixel G'2 of the second pixel group PG2 located in fifth through eighth sub-pixel columns may be driven.

A second scan on time SOT2 in which a second scan signal SS2 is applied to a second scan line SL2 may be divided into a third sub-scan on time SSOT3 and a fourth sub-scan on time SSOT4. Three sub-pixels G'3, R3 and G3 of a third pixel group PG3 and one sub-pixel B4 of a fourth pixel group PG4 may be driven in the third sub-scan on time SSOT3, and three sub-pixels G'4, R4 and G4 of the fourth pixel group PG4 and one sub-pixel B3 of the third pixel group PG3 may be driven in the fourth sub-scan on time SSOT4. To perform this operation, a data remapper 190 of FIG. 1 may convert RGBG' data illustrated in a table 510 in FIG. 10 into RGBG' data illustrated in a table 530 in FIG. 10. That is, the data remapper 190 may swap data DB3 for the one sub-pixel B3 of the third pixel group PG3 and data DB4 for the one sub-pixel B4 of the fourth pixel group PG4 in the RGBG' data.

Figure 11A:
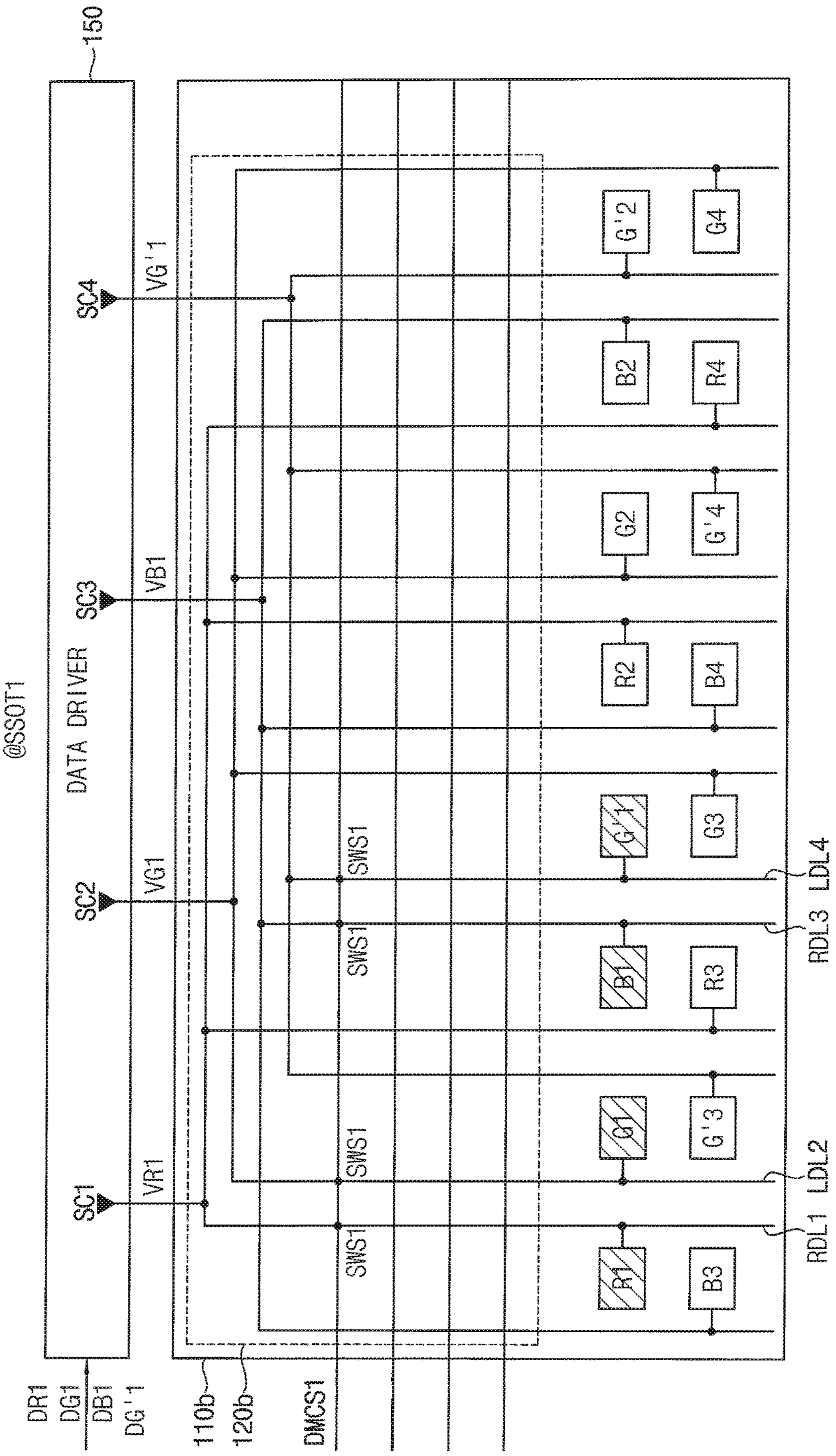
FIGS. 11A through 11D are diagrams for describing an operation of a display panel of FIG. 8 during first through fourth sub-scan on times.
Figure 11B:
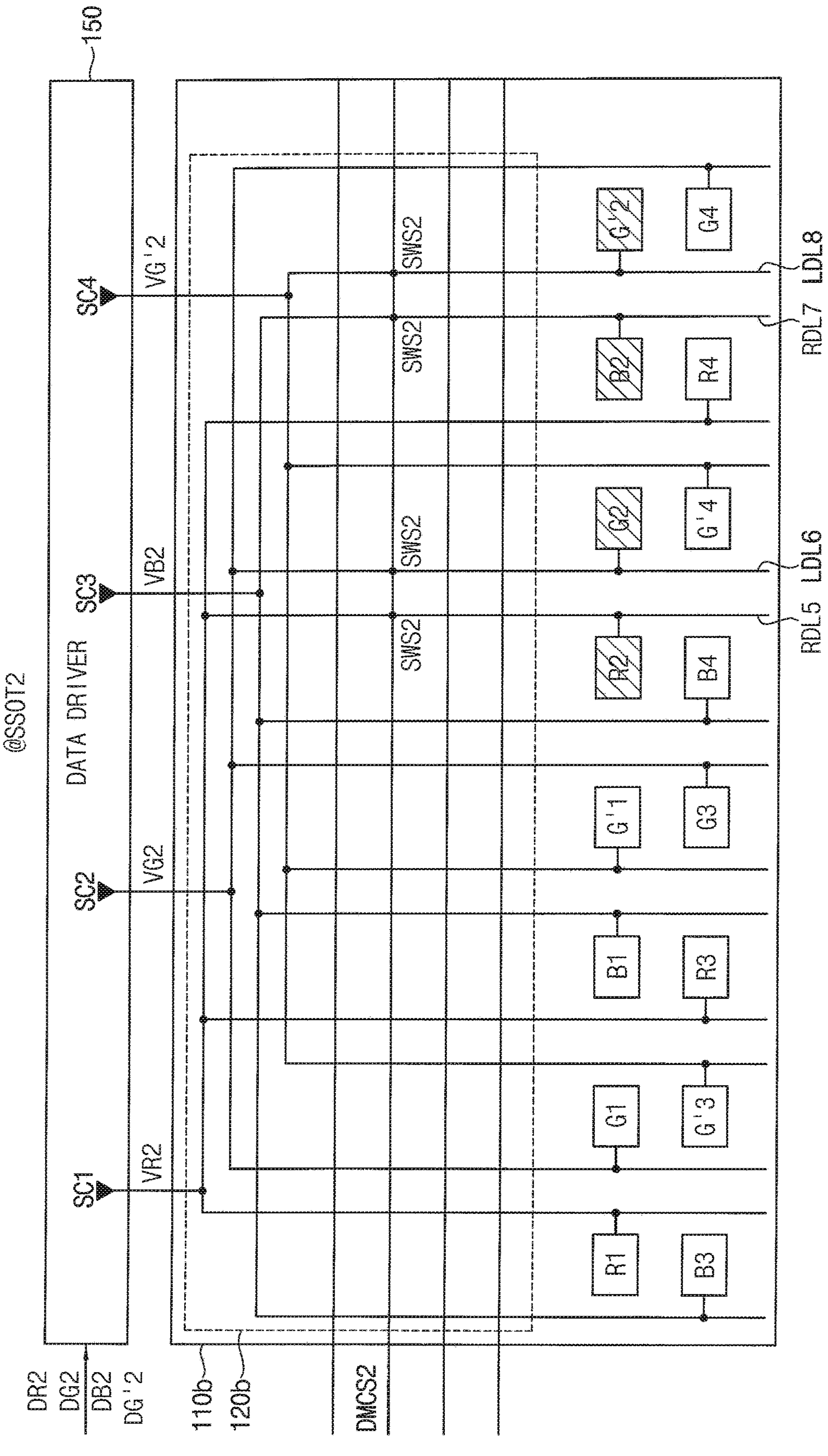
Figure 11C:
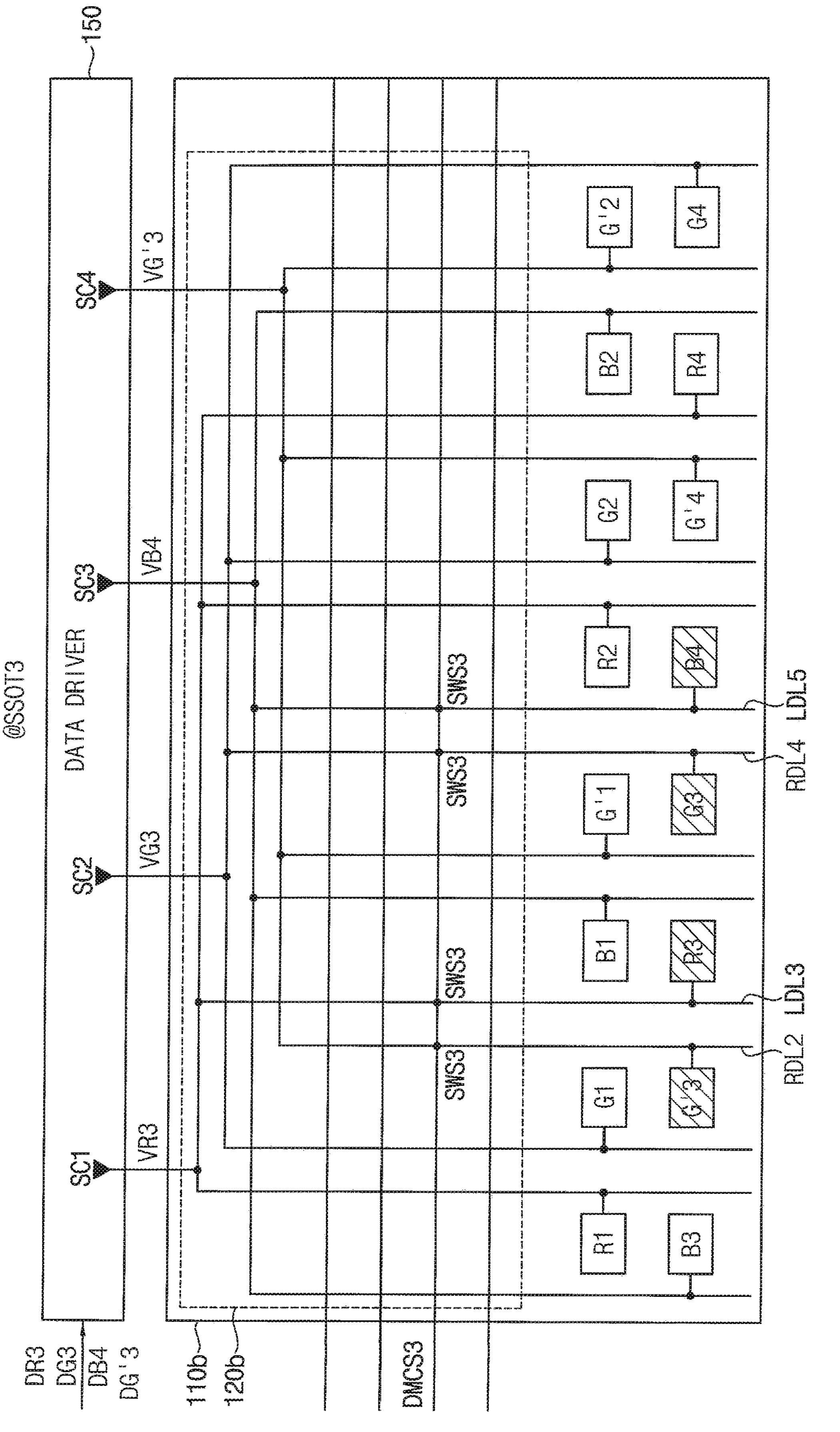

During the third sub-scan on time SSOT3, as illustrated in FIG. 11C, a data driver 150 may receive image data DR3, DG3, DB4 and DG'3 for the three sub-pixels G'3, R3 and G3 of the third pixel group PG3 and the one sub-pixel B4 of the fourth pixel group PG4, and may output data voltages VR3, VG3, VB4 and VG'3 corresponding to the image data DR3, DG3, DB4 and DG'3 through the source channels SC1, SC2, SC3 and SC4. Third demux switches SWS3 of a demultiplexer circuit 120*b* may couple the source channels SC1, SC2, SC3 and SC4 to data lines RDL2, LDL3, RDL4 and LDL5 coupled to the three sub-pixels G'3, R3 and G3 of the third pixel group PG3 and the one sub-pixel B4 of the fourth pixel group PG4 in response to a third demux control signal DMCS3. Accordingly, in the third sub-scan on time SSOT3, a third G' sub-pixel G'3, a third R sub-pixel R3 and a third G sub-pixel G3 of the third pixel group PG3 and a fourth B sub-pixel B4 of the fourth pixel group PG4 located in the second through fifth sub-pixel columns may be driven.

Figure 11D:
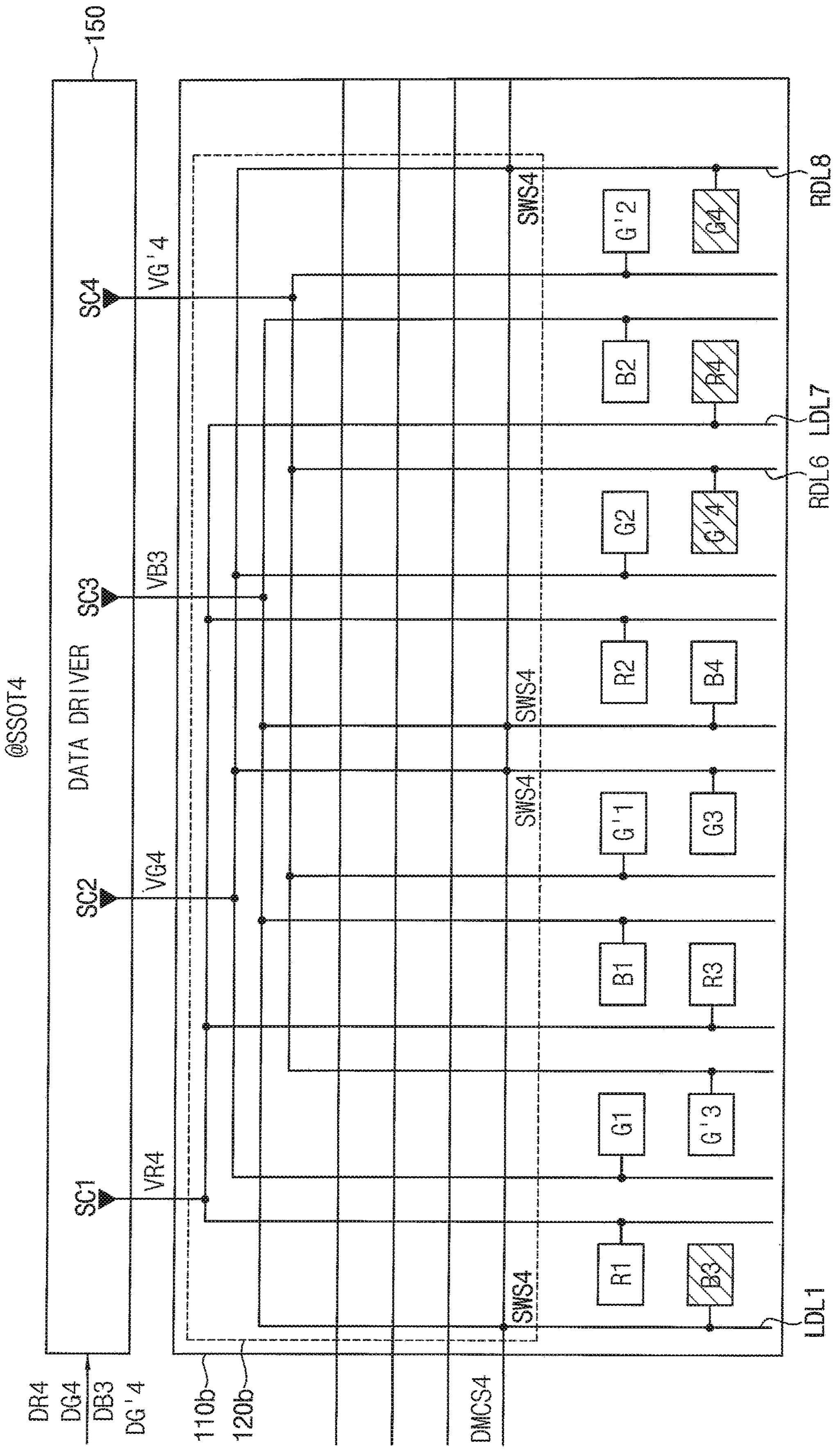

During the fourth sub-scan on time SSOT4, as illustrated in FIG. 11D, the data driver 150 may receive image data DR4, DG4, DB3 and DG'4 for the three sub-pixels G'4, R4 and G4 of the fourth pixel group PG4 and the one sub-pixel B3 of the third pixel group PG3, and may output data voltages VR4, VG4, VB3 and VG'4 corresponding to the image data DR4, DG4, DB3 and DG'4 through the source channels SC1, SC2, SC3 and SC4. Fourth demux switches SWS4 of the demultiplexer circuit 120*b* may couple the source channels SC1, SC2, SC3 and SC4 to data lines RDL6, LDL7, RDL8 and LDL1 coupled to the three sub-pixels G'4, R4 and G4 of the fourth pixel group PG4 and the one sub-pixel B3 of the third pixel group PG3 in response to a fourth demux control signal DMCS4. Accordingly, in the fourth sub-scan on time SSOT4, a fourth G' sub-pixel G'4, a fourth R sub-pixel R4 and a fourth G sub-pixel G4 of the fourth pixel group PG4 located in the sixth through eighth sub-pixel columns and a third B sub-pixel B3 of the third pixel group PG3 located in the first sub-pixel column may be driven.

Accordingly, since data lines between adjacent sub-pixel columns may be substantially simultaneously driven and all sub-pixels located in eight sub-pixel columns may be driven by four source channels SC1, SC2, SC3 and SC4, a coupling between the data lines may be prevented without a dummy source channel.

Figure 12:
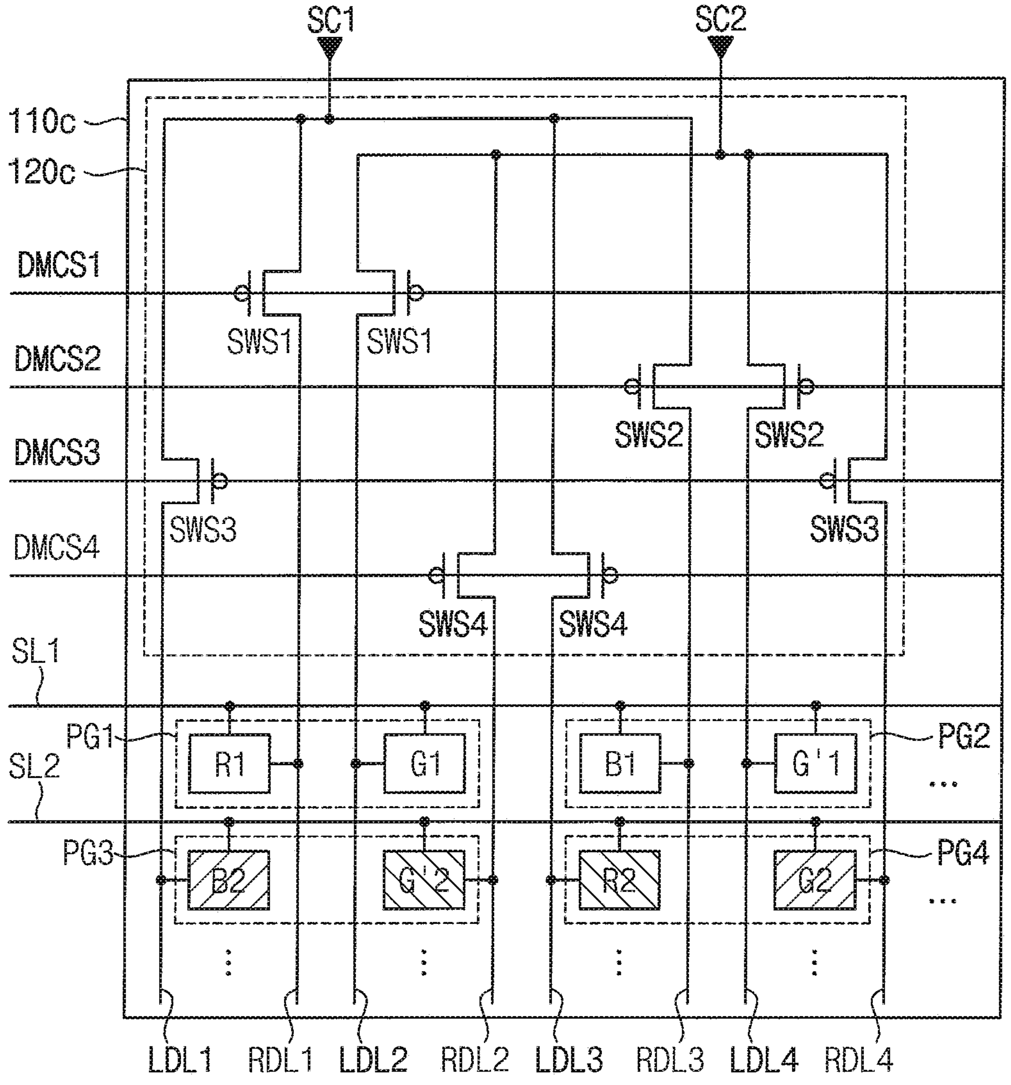
FIG. 12 is a diagram illustrating a display panel according to exemplary embodiments.

FIG. 12 is a diagram illustrating a display panel according to exemplary embodiments, and FIGS. 13A through 13D are diagrams for describing an operation of a display panel of FIG. 12 during first through fourth sub-scan on times.

Unlike a display panel 110*a* of FIG. 4 where each pixel group includes four sub-pixels, each pixel group PG1, PG2, PG3 and PG4 of a display panel 110*c* of FIG. 12 may include two sub-pixels. Referring to FIG. 12, the display panel 110*c* may include first through fourth pixel groups PG1, PG2, PG3 and PG4 and a demultiplexer circuit 120*c*.

The first pixel group PG1 may include a first R sub-pixel R1 and a first G sub-pixel G1 coupled to a first scan line SL1 and located in first and second sub-pixel columns, the second pixel group PG2 may include a first B sub-pixel B1 and a first G' sub-pixel G'1 coupled to the first scan line SL1 and located in third and fourth sub-pixel columns, the third pixel group PG3 may include a second B sub-pixel B2 and a second G' sub-pixel G'2 coupled to a second scan line SL2 and located in the first and second sub-pixel columns, and the fourth pixel group PG4 may include a second R sub-pixel R2 and a second G sub-pixel G2 coupled to the second scan line SL2 and located in the third and fourth sub-pixel columns.

A first scan on time in which the first scan line SL1 is driven may be divided into a first sub-scan on time and a second sub-scan on time.

Figure 13A:
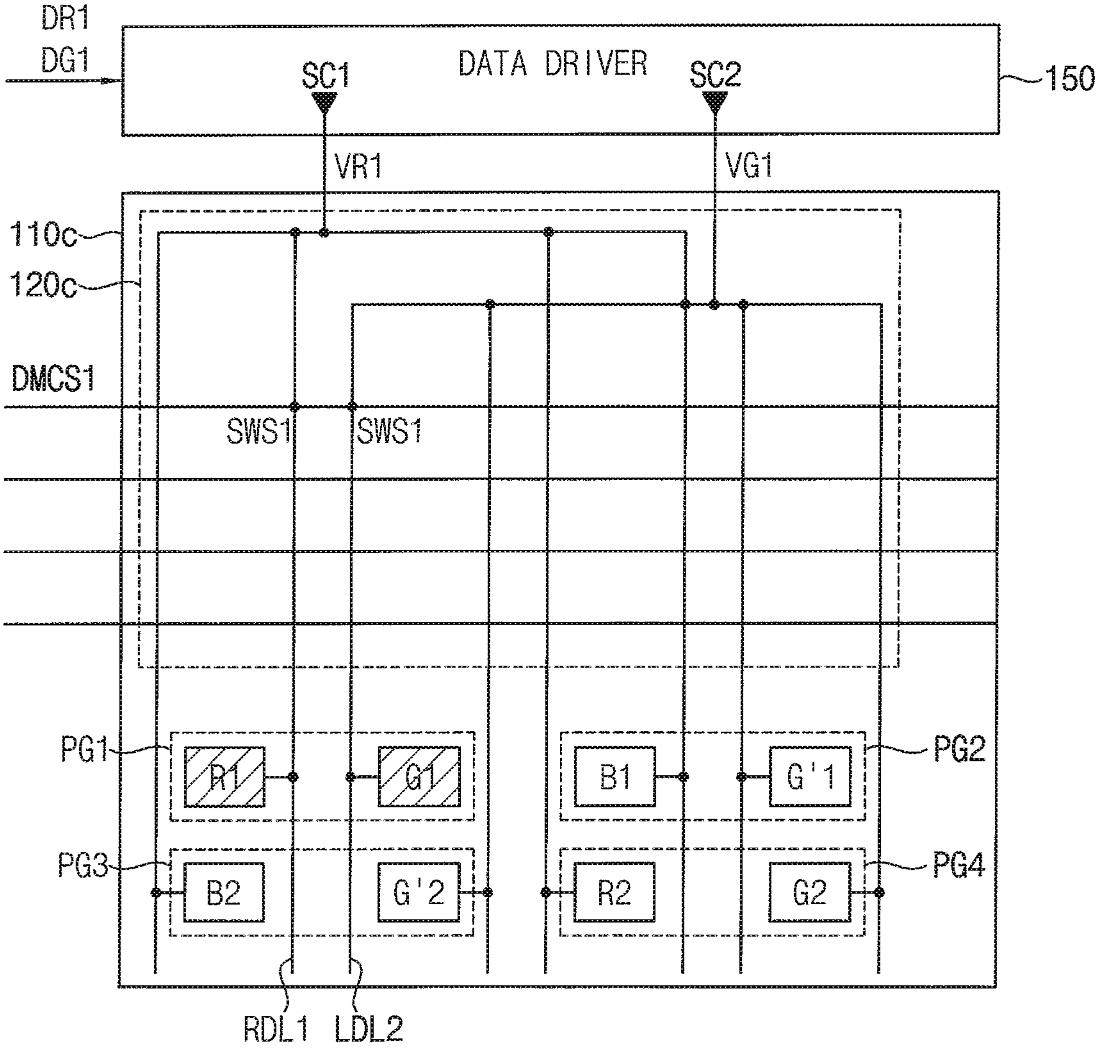
FIGS. 13A through 13D are diagrams for describing an operation of a display panel of FIG. 12 during first through fourth sub-scan on times.

During the first sub-scan on time, as illustrated in FIG. 13A, a data driver 150 may receive image data DR1 and DG1 for the sub-pixels R1 and G1 of the first pixel group PG1, and may output data voltages VR1 and VG1 corresponding to the image data DRland DG1 through source channels SC1 and SC2. First demux switches SWS1 of the demultiplexer circuit 120*c* may couple the source channels SC1 and SC2 to data lines RDL1 and LDL2 coupled to the sub-pixels R1 and G1 of the first pixel group PG1 in response to a first demux control signal DMCS1. Accordingly, in the first sub-scan on time, the first R sub-pixel R1 and the first G sub-pixel G1 of the first pixel group PG1 may be driven.

Figure 13B:
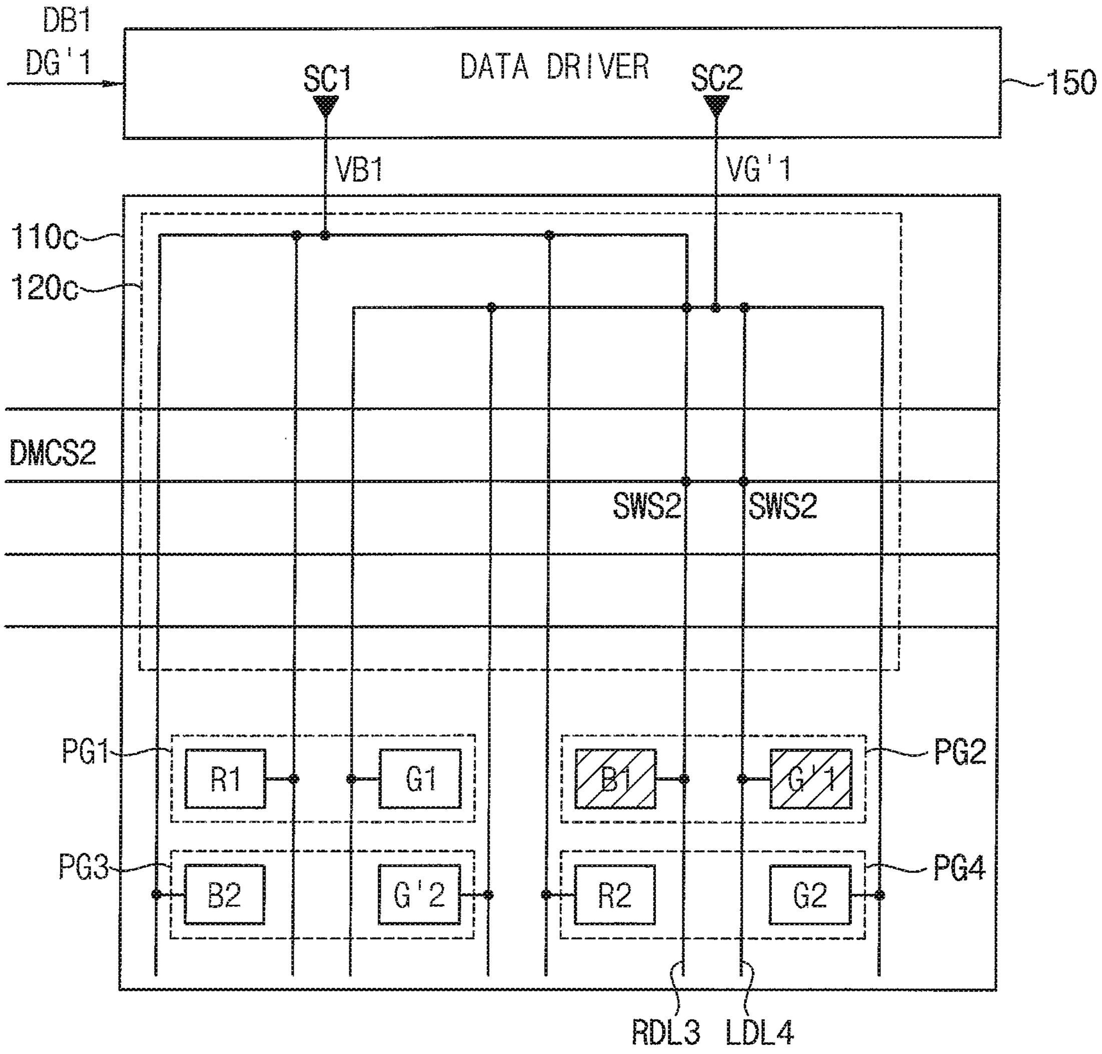

During the second sub-scan on time, as illustrated in FIG. 13B, the data driver 150 may receive image data DB1 and DG' 1 for the sub-pixels B1 and G' 1 of the second pixel group PG2, and may output data voltages VB1 and VG' 1 corresponding to the image data DB1 and DG'1 through the source channels SC1 and SC2. Second demux switches SWS2 of the demultiplexer circuit 120*c* may couple the source channels SC1 and SC2 to data lines RDL3 and LDL4 coupled to the sub-pixels B1 and G' 1 of the second pixel group PG2 in response to a second demux control signal DMCS2. Accordingly, in the second sub-scan on time, the first B sub-pixel B1 and the first G' sub-pixel G' 1 of the second pixel group PG2 may be driven.

A second scan on time in which the second scan line SL2 is driven may be divided into a third sub-scan on time and a fourth sub-scan on time.

Figure 13C:
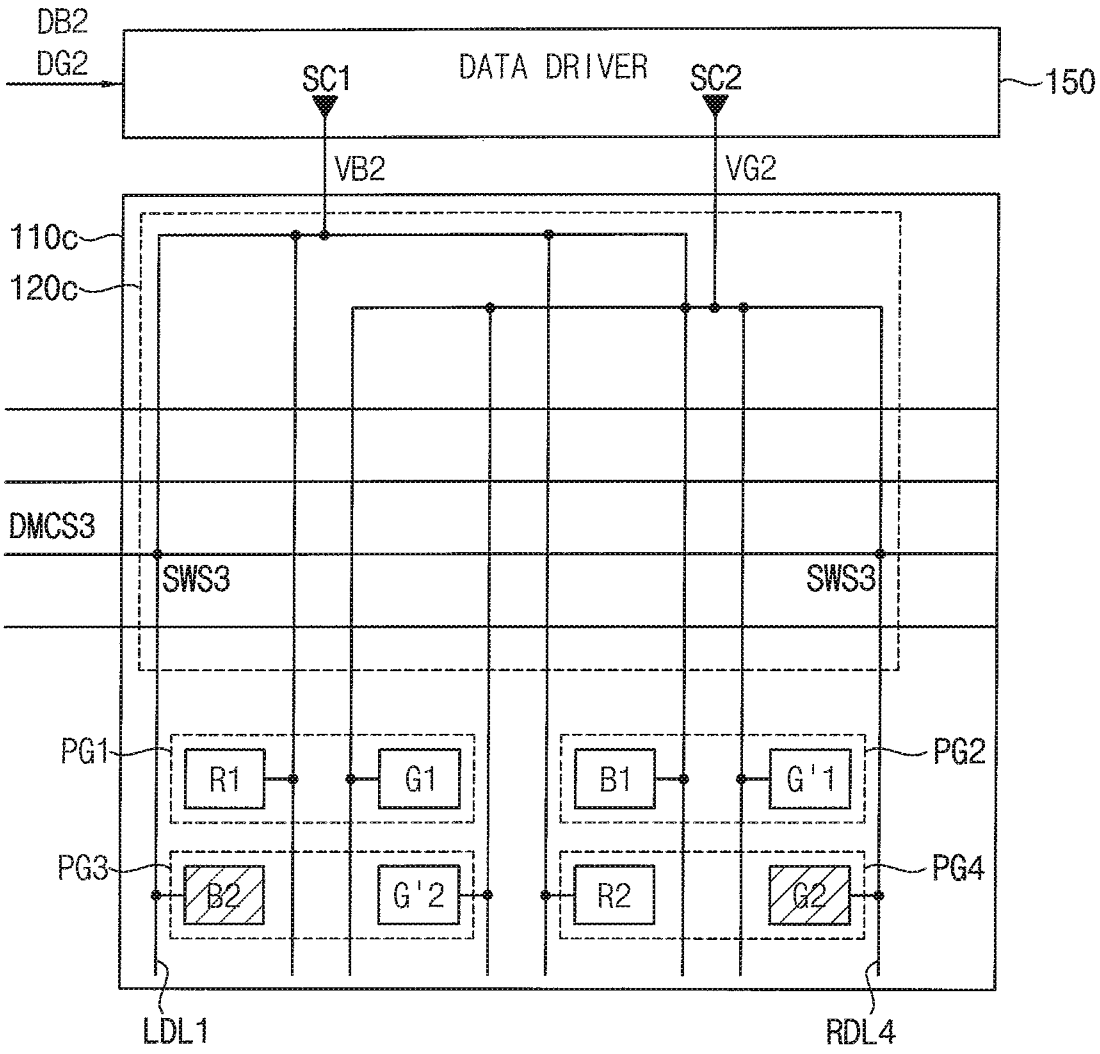

During the third sub-scan on time, as illustrated in FIG. 13C, the data driver 150 may receive image data DB2 and DG2 for one sub-pixel B2 of the third pixel group PG3 and one sub-pixel G2 of the fourth pixel group PG4, and may output data voltages VB2 and VG2 corresponding to the image data DB2 and DG2 through the source channels SC1 and SC2. Third demux switches SWS3 of the demultiplexer circuit 120*c* may couple the source channels SC1 and SC2 to data lines LDL1 and RDL4 coupled to the one sub-pixel B2 of the third pixel group PG3 and the one sub-pixel G2 of the fourth pixel group PG4 in response to a third demux control signal DMCS3. Accordingly, in the third sub-scan on time, the second B sub-pixel B2 of the third pixel group PG3 and the second G sub-pixel G2 of the fourth pixel group PG4 may be driven.

Figure 13D:
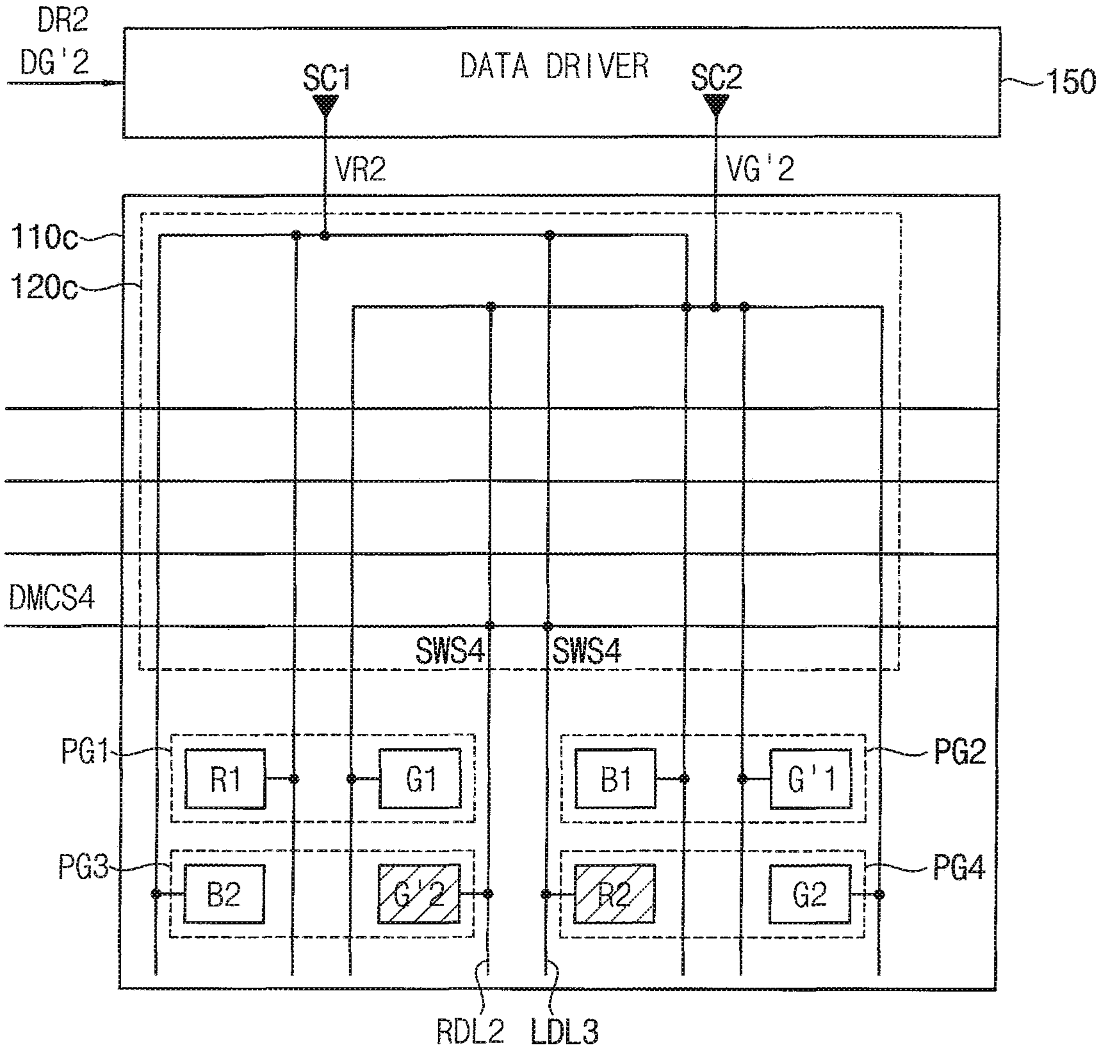

During the fourth sub-scan on time, as illustrated in FIG. 13D, the data driver 150 may receive image data DR2 and DG'2 for one sub-pixel R2 of the fourth pixel group PG4 and one sub-pixel G'2 of the third pixel group PG3, and may output data voltages VR2 and VG'2 corresponding to the image data DR2 and DG'2 through the source channels SC1 and SC2. Fourth demux switches SWS4 of the demultiplexer circuit 120*c* may couple the source channels SC1 and SC2 to data lines RDL2 and LDL3 coupled to the one sub-pixel R2 of the fourth pixel group PG4 and the one sub-pixel G'2 of the third pixel group PG3 in response to a fourth demux control signal DMCS4. Accordingly, in the fourth sub-scan on time, the second R sub-pixel R2 of the fourth pixel group PG4 and the second G' sub-pixel G'2 of the third pixel group PG3 may be driven.

Accordingly, since data lines between adjacent sub-pixel columns may be substantially simultaneously driven and all sub-pixels located in four sub-pixel columns may be driven by two source channels SC1 and SC2, a coupling between the data lines may be prevented without a dummy source channel. However, although each of source channels for driving the display panel 110*a* of FIG. 4 drives the same color of sub-pixels, among the source channels SC1 and SC2 for driving the display panel 110*c* of FIG. 12, a first source channel SC1 may drive red sub-pixels R1 and R2 and blue sub-pixels B1 and B2. Accordingly, in a display device including the display panel 110*c* of FIG. 12, a transition time for changing a color of the fir source channel SC1 may be required.

Figure 14:
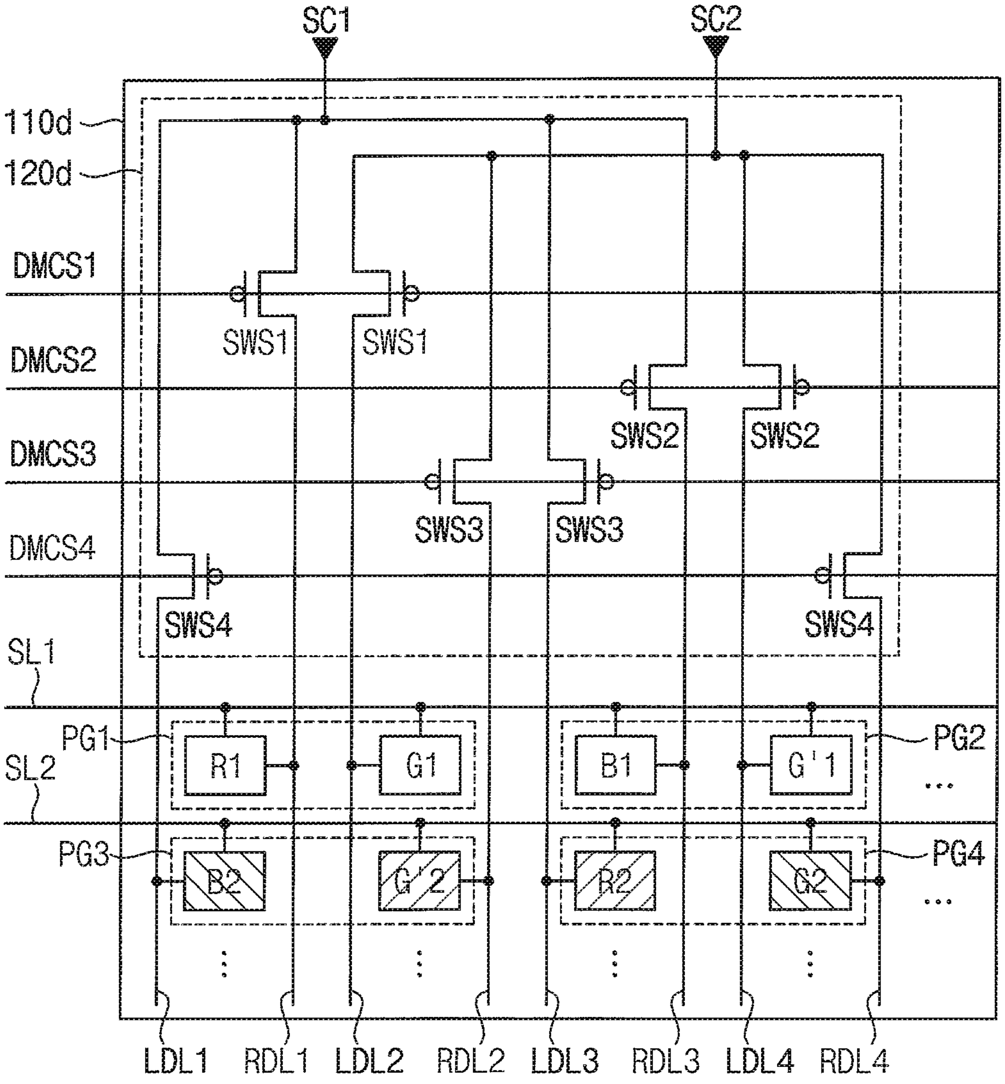
FIG. 14 is a diagram illustrating a display panel according to exemplary embodiments.

FIG. 14 is a diagram illustrating a display panel according to exemplary embodiments, and FIGS. 15A through 15D are diagrams for describing an operation of a display panel of FIG. 14 during first through fourth sub-scan on times.

A display panel 110*d* of FIG. 14 may have a similar configuration and a similar operation to a display panel 110*c* of FIG. 12, except that, unlike the display panel 110*c* in which a left sub-pixel shift scheme is applied, a right sub-pixel shift scheme is applied with respect to a sub-pixel row corresponding to a second scan line SL2. Referring to FIG. 14, the display panel 110*d* may include first through fourth pixel groups PG1, PG2, PG3 and PG4 and a demultiplexer circuit 120*d*.

Figure 15A:
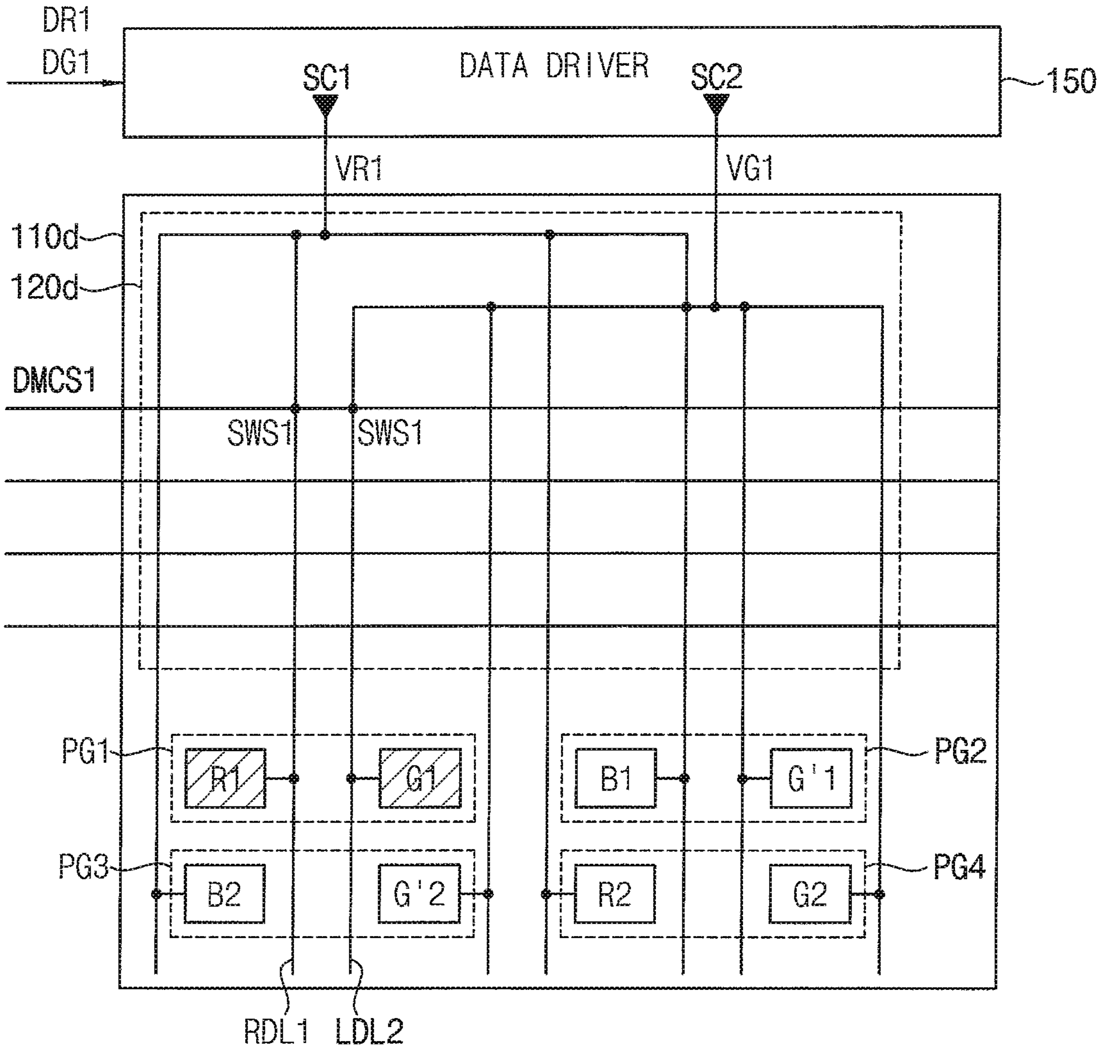
FIGS. 15A through 15D are diagrams for describing an operation of a display panel of FIG. 14 during first through fourth sub-scan on times.
Figure 15B:
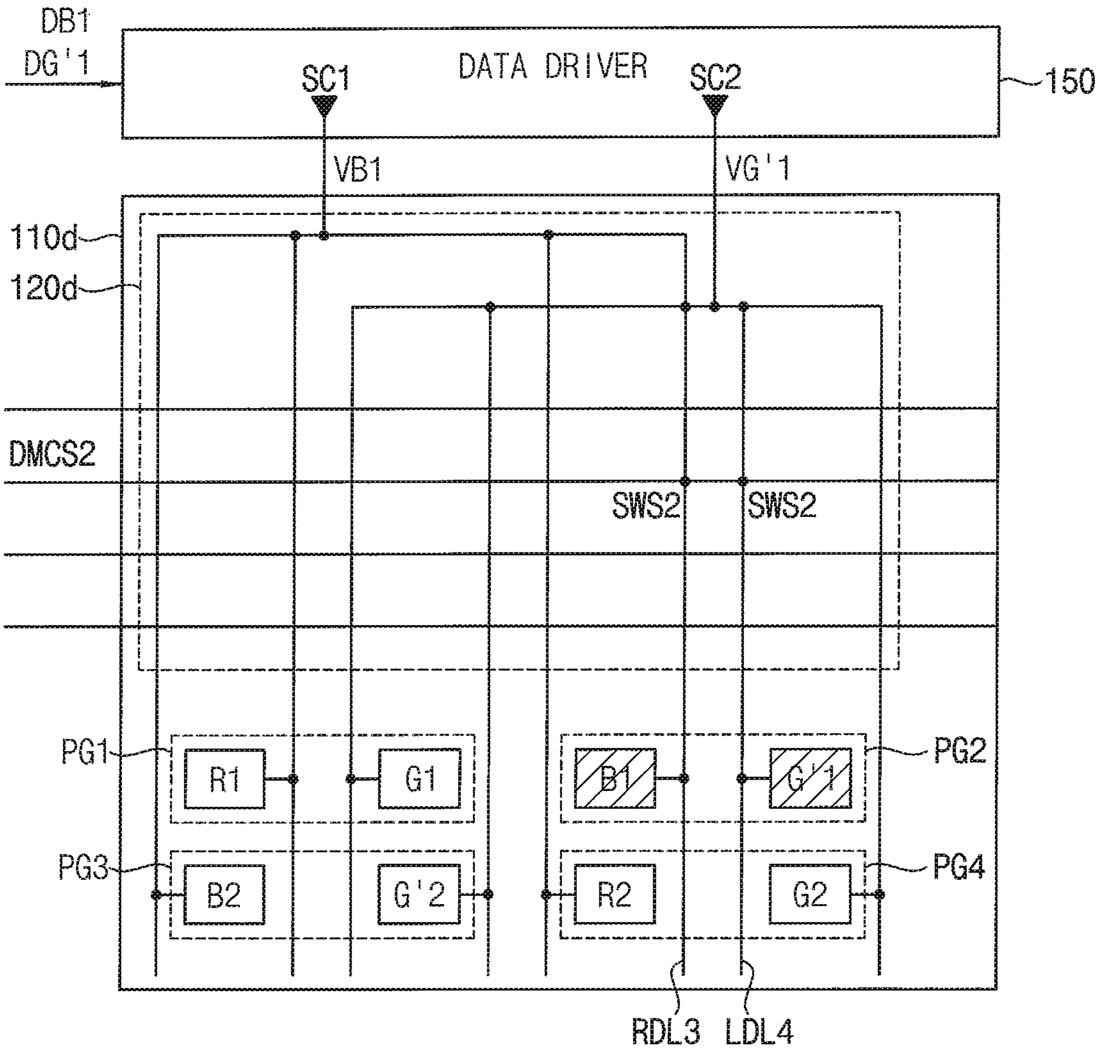

A first scan on time in which a first scan line SL1 is driven may be divided into a first sub-scan on time and a second sub-scan on time. During the first sub-scan on time SSOT1, as illustrated in FIG. 15A, a first R sub-pixel R1 and a first G sub-pixel G1 of the first pixel group PG1 may be driven. During the second sub-scan on time, as illustrated in FIG. 15B, a first B sub-pixel B1 and a first G' sub-pixel G'1 of the second pixel group PG2 may be driven.

A second scan on time in which the second scan line SL2 is driven may be divided into a third sub-scan on time and a fourth sub-scan on time.

Figure 15C:
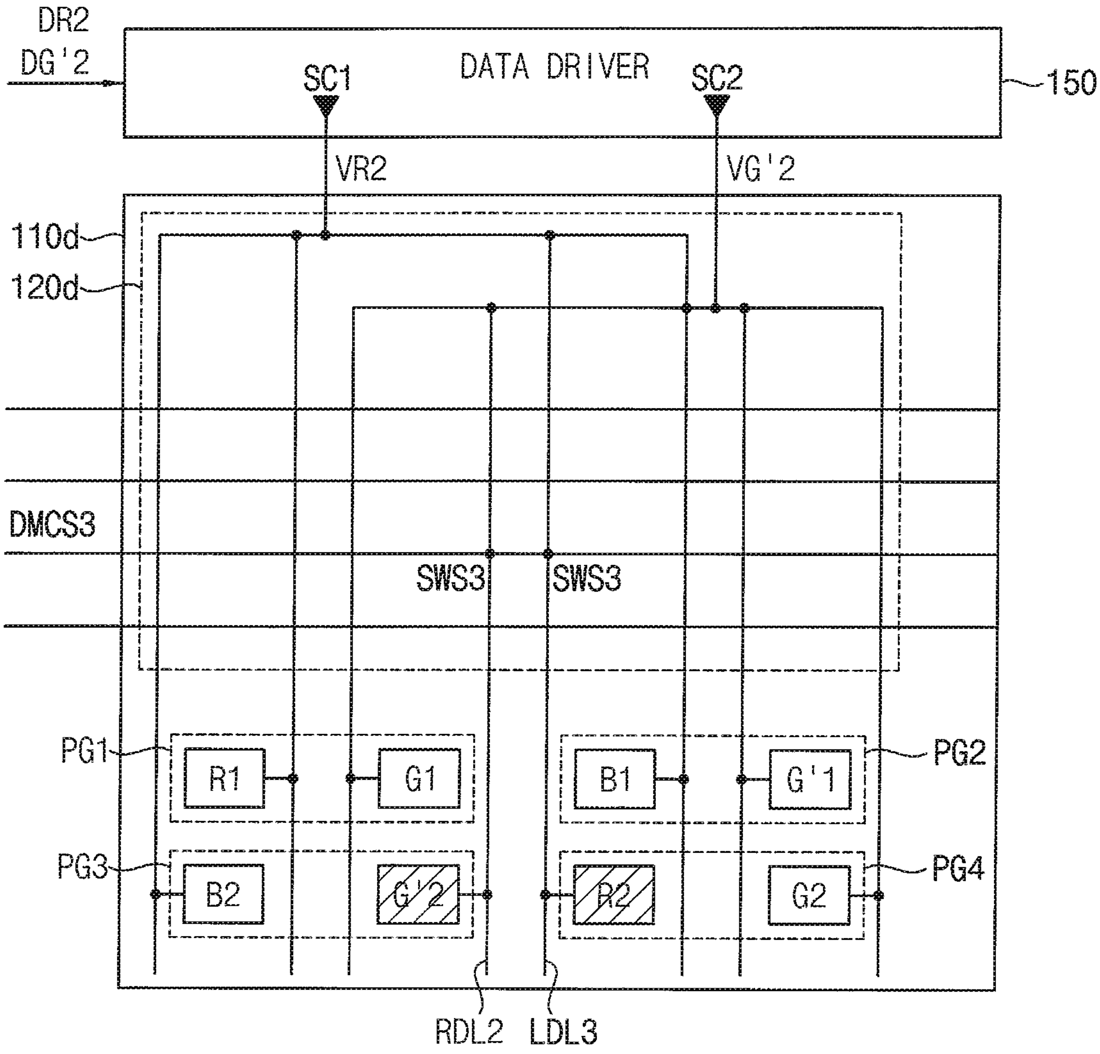

During the third sub-scan on time, as illustrated in FIG. 15C, a data driver 150 may receive image data DR2 and DG'2 for one sub-pixel G'2 of the third pixel group PG3 and one sub-pixel R2 of the fourth pixel group PG4, and may output data voltages VR2 and VG'2 corresponding to the image data DR2 and DG'2 through source channels SC1 and SC2. Third demux switches SWS3 of the demultiplexer circuit 120*d* may couple the source channels SC1 and SC2 to data lines RDL2 and LDL3 coupled to the one sub-pixel G'2 of the third pixel group PG3 and the one sub-pixel R2 of the fourth pixel group PG4 in response to a third demux control signal DMCS3. Accordingly, in the third sub-scan on time, a second G' sub-pixel G2' of the third pixel group PG3 and a second R sub-pixel R2 of the fourth pixel group PG4 may be driven.

Figure 15D:
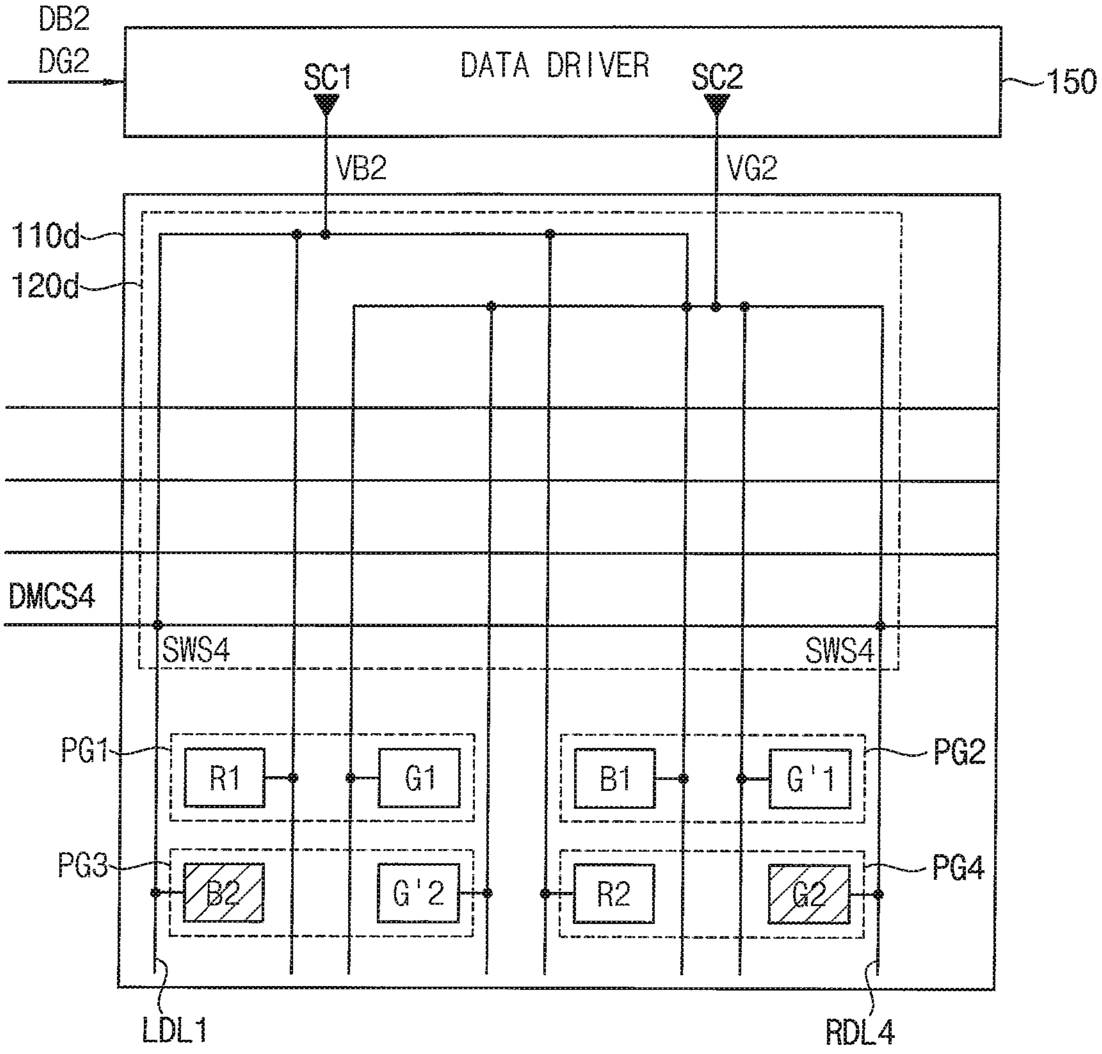

During the fourth sub-scan on time, as illustrated in FIG. 15D, the data driver 150 may receive image data DB2 and DG2 for one sub-pixel G2 of the fourth pixel group PG4 and one sub-pixel B2 of the third pixel group PG3, and may output data voltages VB2 and VG2 corresponding to the image data DB2 and DG2 through the source channels SC1 and SC2. Fourth demux switches SWS4 of the demultiplexer circuit 120*d* may couple the source channels SC1 and SC2 to data lines LDL1 and RDL4 coupled to the one sub-pixel G2 of the fourth pixel group PG4 and the one sub-pixel B2 of the third pixel group PG3 in response to a fourth demux control signal DMCS4. Accordingly, in the fourth sub-scan on time, a second G sub-pixel G2 of the fourth pixel group PG4 and a second B sub-pixel B2 of the third pixel group PG3 may be driven.

Figure 16:
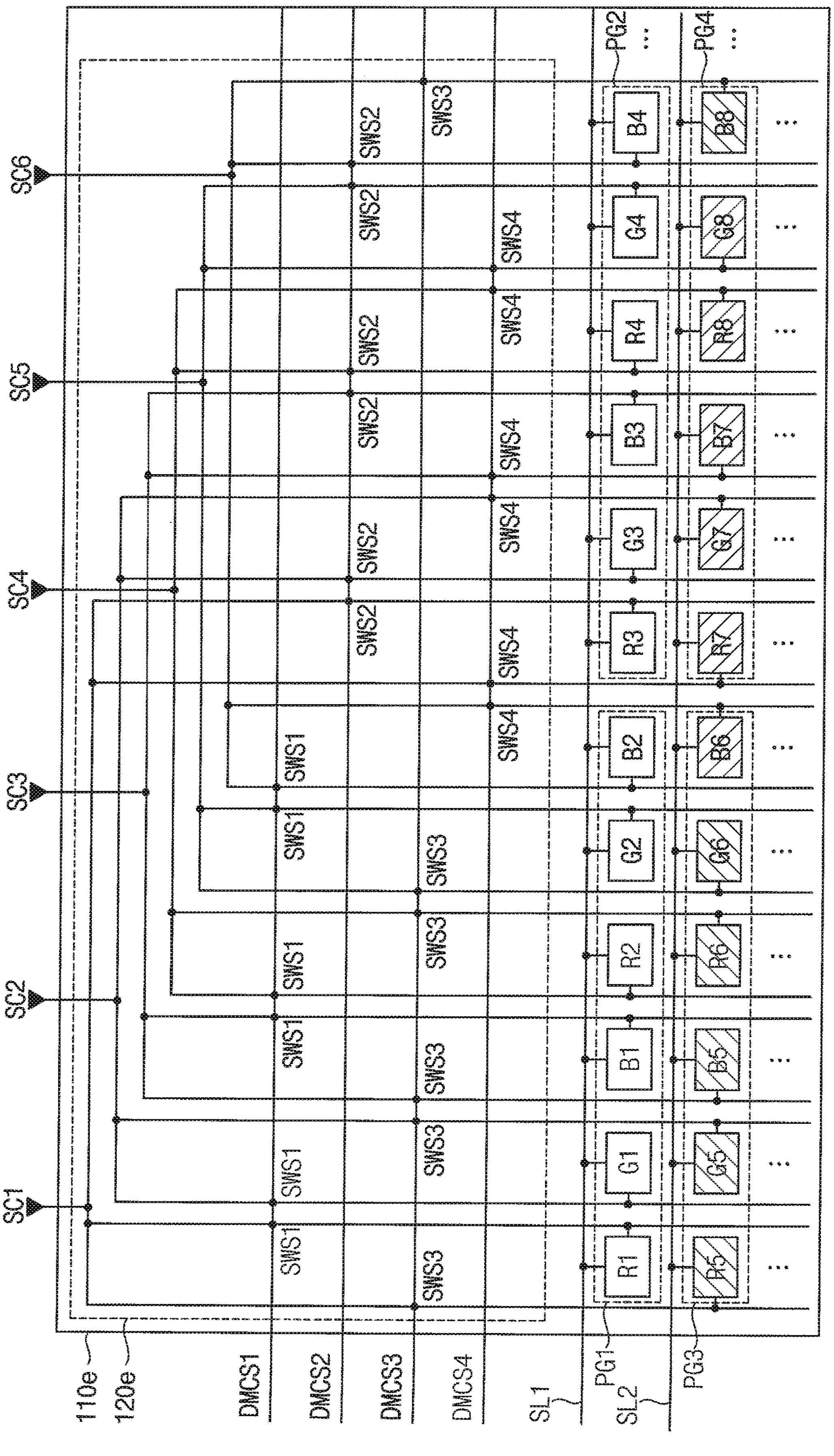
FIG. 16 is a diagram illustrating a display panel according to exemplary embodiments.

FIG. 16 is a diagram illustrating a display panel according to exemplary embodiments.

Unlike a display panel 110*a* of FIG. 4 having an RGBG' pixel structure, a display panel 110*e* of FIG. 16 may have an RGB pixel structure. Referring to FIG. 16, the display panel 110*e* may include first through fourth pixel groups PG1, PG2, PG3 and PG4 and a demultiplexer circuit 120*e*.

The first pixel group PG1 may include a first R sub-pixel R1, a first G sub-pixel G1, a first B sub-pixel B1, a second R sub-pixel R2, a second G sub-pixel G2 and a second B sub-pixel B2 respectively located in first through sixth sub-pixel columns, the second pixel group PG2 may include a third R sub-pixel R3, a third G sub-pixel G3, a third B sub-pixel B3, a fourth R sub-pixel R4, a fourth G sub-pixel G4 and a fourth B sub-pixel B4 respectively located in seventh through twelfth sub-pixel columns, the third pixel group PG3 may include a fifth R sub-pixel R5, a fifth G sub-pixel G5, a fifth B sub-pixel B5, a sixth R sub-pixel R6, a sixth G sub-pixel G6 and a sixth B sub-pixel B6 respectively located in the first through sixth sub-pixel columns, and the fourth pixel group PG4 may include a seventh R sub-pixel R7, a seventh G sub-pixel G7, a seventh B sub-pixel B7, an eighth R sub-pixel R8, an eighth G sub-pixel G8 and an eighth B sub-pixel B8 respectively located in the seventh through twelfth sub-pixel columns.

A first scan on time in which a first scan line SL1 is driven may be divided into a first sub-scan on time and a second sub-scan on time. During the first sub-scan on time SSOT1, first demux switches SWS1 of the demultiplexer circuit 120*e* may couple source channels SC1, SC2, SC3, SC4, SC5 and SC6 to data lines coupled to the sub-pixels R1, G1, B1, R2, G2 and B2 of the first pixel group PG1 in response to a first demux control signal DMCS1. Accordingly, in the first sub-scan on time, the sub-pixels R1, G1, B1, R2, G2 and B2 of the first pixel group PG1 may be driven. Further, during the second sub-scan on time SSOT1, second demux switches SWS2 of the demultiplexer circuit 120*e* may couple the source channels SC1, SC2, SC3, SC4, SC5 and SC6 to data lines coupled to the sub-pixels R3, G3, B3, R3, G3 and B3 of the second pixel group PG2 in response to a second demux control signal DMCS2. Accordingly, in the second sub-scan on time, the sub-pixels R3, G3, B3, R3, G3 and B3 of the second pixel group PG2 may be driven.

A second scan on time in which a second scan line SL2 is driven may be divided into a third sub-scan on time and a fourth sub-scan on time. During the third sub-scan on time, third demux switches SWS3 of the demultiplexer circuit 120*e* may couple the source channels SC1, SC2, SC3, SC4, SC5 and SC6 to data lines coupled to five sub-pixels R5, G5, B5, R5 and G5 of the third pixel group PG3 and one sub-pixel B8 of the fourth pixel group PG4 in response to a third demux control signal DMCS3. Accordingly, in the third sub-scan on time, the five sub-pixels R5, G5, B5, R5 and G5 of the third pixel group PG3 and the one sub-pixel B8 of the fourth pixel group PG4 may be driven. Further, during the fourth sub-scan on time, fourth demux switches SWS4 of the demultiplexer circuit 120*e* may couple the source channels SC1, SC2, SC3, SC4, SC5 and SC6 to data lines coupled to five sub-pixels R7, G7, B7, R8 and G8 of the fourth pixel group PG4 and one sub-pixel B6 of the third pixel group PG3 in response to a fourth demux control signal DMCS4. Accordingly, in the fourth sub-scan on time, the five sub-pixels R7, G7, B7, R8 and G8 of the fourth pixel group PG4 and the one sub-pixel B6 of the third pixel group PG3 may be driven.

Accordingly, since data lines between adjacent sub-pixel columns may be substantially simultaneously driven and all sub-pixels located in twelve sub-pixel columns may be driven by six source channels SC1, SC2, SC3, SC4, SC5 and SC6, a coupling between the data lines may be prevented without a dummy source channel.

Figure 17:
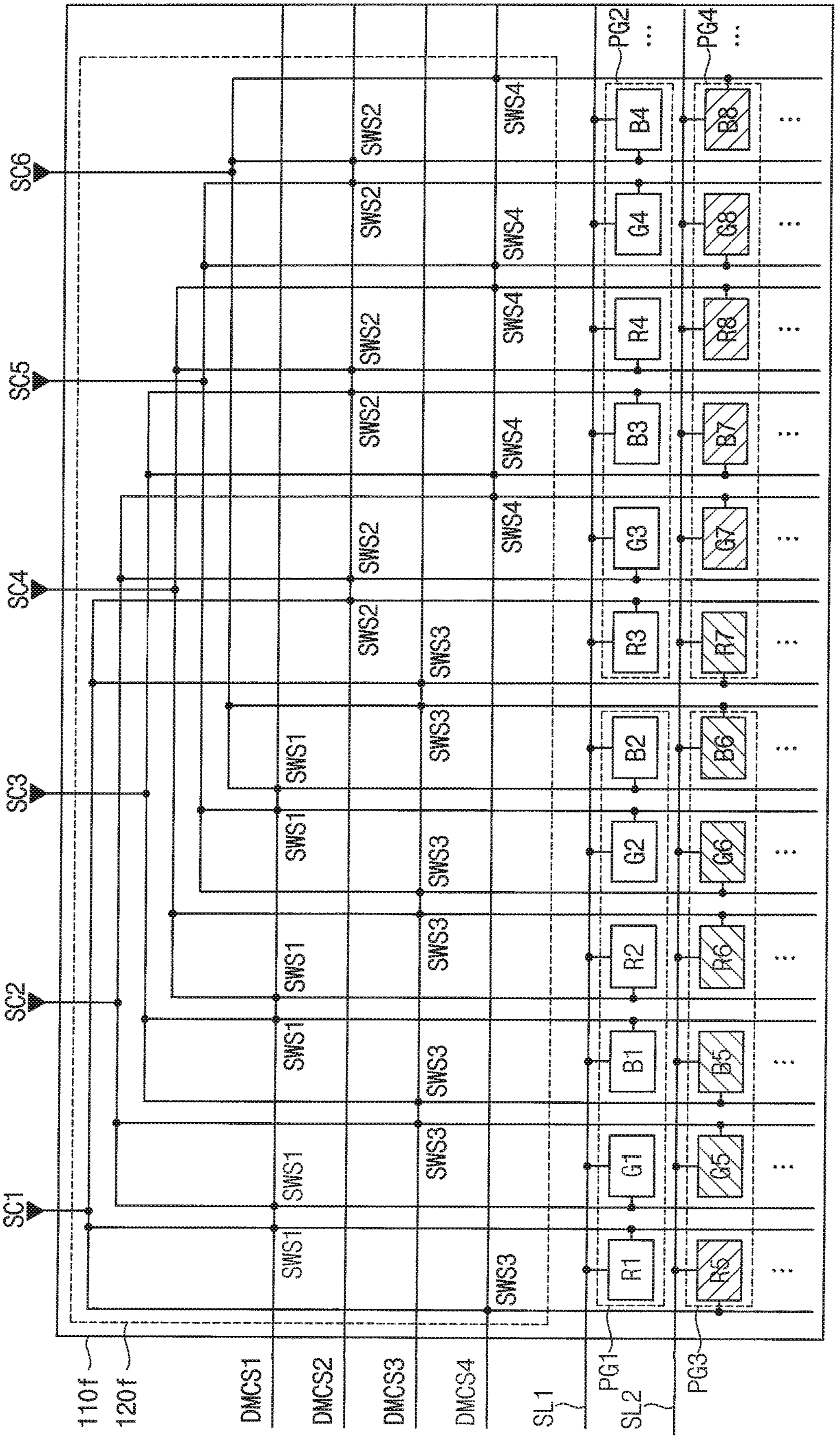
FIG. 17 is a diagram illustrating a display panel according to exemplary embodiments.

FIG. 17 is a diagram illustrating a display panel according to exemplary embodiments.

A display panel 110*f* of FIG. 17 may have a similar configuration and a similar operation to a display panel 110*e* of FIG. 16, except that, unlike the display panel 110*e* in which a left sub-pixel shift scheme is applied, a right sub-pixel shift scheme is applied with respect to a sub-pixel row corresponding to a second scan line SL2. Referring to FIG. 17, the display panel 110*f* may include first through fourth pixel groups PG1, PG2, PG3 and PG4 and a demultiplexer circuit 120*f*.

A first scan on time in which a first scan line SL1 is driven may be divided into a first sub-scan on time and a second sub-scan on time. During the first sub-scan on time SSOT1, sub-pixels R1, G1, B1, R2, G2 and B2 of the first pixel group PG1 may be driven. During the second sub-scan on time, sub-pixels R3, G3, B3, R3, G3 and B3 of the second pixel group PG2 may be driven.

A second scan on time in which the second scan line SL2 is driven may be divided into a third sub-scan on time and a fourth sub-scan on time. During the third sub-scan on time, five sub-pixels G5, B5, R5, G5 and B6 of the third pixel group PG3 and one sub-pixel R7 of the fourth pixel group PG4 may be driven. Further, during the fourth sub-scan on time, five sub-pixels G7, B7, R8, G8 and B8 of the fourth pixel group PG4 and one sub-pixel R5 of the third pixel group PG3 may be driven.

Figure 18:
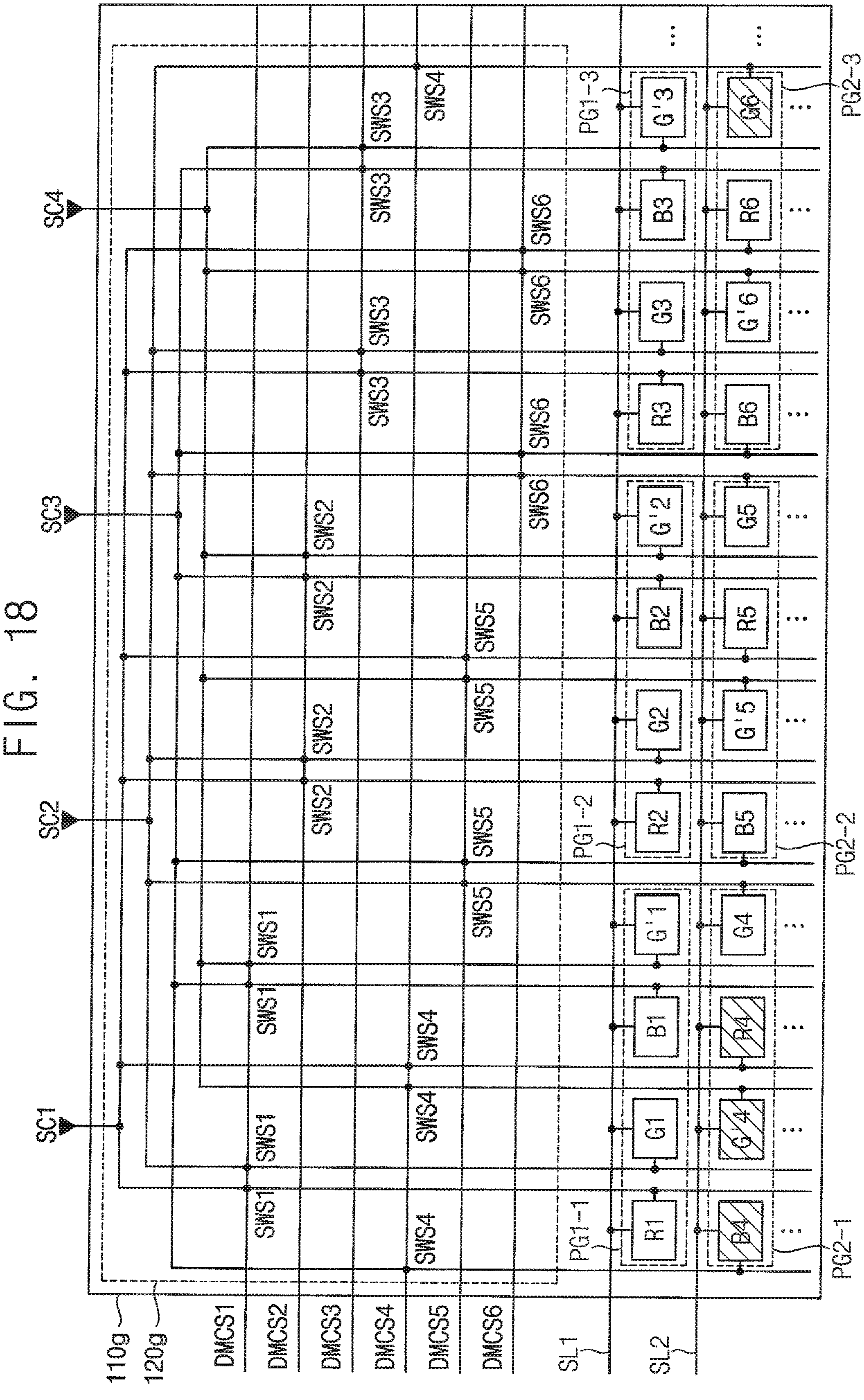
FIG. 18 is a diagram illustrating a display panel according to exemplary embodiments.

FIG. 18 is a diagram illustrating a display panel according to exemplary embodiments.

Unlike a display panel 110*a* of FIG. 4 where a 1:2 demux driving scheme is employed, a 1:3 demux driving scheme may be employed in a display panel 110*g* of FIG. 18. Although FIG. 4 illustrates an example of the display panel 110*a* where the 1:2 demux driving scheme is employed, and FIG. 18 illustrates an example of the display panel 110*g* where the 1:3 demux driving scheme is employed, it would be understood that any demux driving scheme having a ratio of 1:4, a ratio of 1:5, a ratio of 1:6, or any ratio can be employed in a display panel according to exemplary embodiments.

Referring to FIG. 18, the display panel 110*g* may include M first pixel groups PG1-1, PG1-2 and PG1-3 and M second pixel groups PG2-1, PG2-2 and PG2-3, where M is an integer greater than 1. Each first pixel group PG1-1, PG1-2 and PG1-3 may include sub-pixels coupled to a first scan line SL1 and located in consecutive N sub-pixel columns, where N is an even number greater than or equal to 2, and each second pixel group PG2-1, PG2-2 and PG2-3 may include sub-pixels coupled to a second scan line SL2 adjacent to the first scan line SL1 and located in the consecutive N sub-pixel columns. In the display panel 110*g*, the first pixel groups PG1-1, PG1-2 and PG1-3 may be sequentially driven during a first scan on time in which the first scan line SL1 is driven. A second scan on time in which the second scan line SL2 is driven may be divided into M sub-scan on times, and consecutive N−1 sub-pixels (e.g., B4, G'4 and R4) among the sub-pixels of a first one (e.g., PG2-1) of the second pixel groups PG2-1, PG2-2 and PG2-3 and one sub-pixel (e.g., G6) among the sub-pixels of a second one (e.g., PG2-3) of the second pixel groups PG2-1, PG2-2 and PG2-3 may be driven during each sub-scan on time.

For example, a (1-1)-th pixel group PG1-1 may include a first R sub-pixel R1, a first G sub-pixel G1, a first B sub-pixel B1 and a first G' sub-pixel G1', a (1-2)-th pixel group PG1-2 may include a second R sub-pixel R2, a second G sub-pixel G2, a second B sub-pixel B2 and a second G' sub-pixel G2', and a (1-3)-th pixel group PG1-3 may include a third R sub-pixel R3, a third G sub-pixel G3, a third B sub-pixel B3 and a third G' sub-pixel G3'. Further, a (2-1)-th pixel group PG2-1 may include a fourth B sub-pixel B4, a fourth G' sub-pixel G4', a fourth R sub-pixel R4 and a fourth G sub-pixel G4, a (2-2)-th pixel group PG2-2 may include a fifth B sub-pixel B5, a fifth G' sub-pixel G5', a fifth R sub-pixel R5 and a fifth G sub-pixel G5, and a (2-3)-th pixel group PG2-3 may include a sixth B sub-pixel B6, a sixth G' sub-pixel G6', a sixth R sub-pixel R6 and a sixth G sub-pixel G6.

Further, the display panel 110*g* may further include a demultiplexer circuit 120*g*. The demultiplexer circuit 120*g* may include first demux switches SWS1 that couple source channels SC1, SC2, SC3 and SC4 to data lines coupled to the sub-pixels R1, G1, B1 and G'1 of the (1-1)-th pixel group PG1-1 in response to a first demux control signal DMCS1, second demux switches SWS2 that couple the source channels SC1, SC2, SC3 and SC4 to data lines coupled to the sub-pixels R2, G2, B2 and G'2 of the (1-2)-th pixel group PG1-2 in response to a second demux control signal DMCS2, third demux switches SWS3 that couple the source channels SC1, SC2, SC3 and SC4 to data lines coupled to the sub-pixels R3, G3, B3 and G'3 of the (1-3)-th pixel group PG1-3 in response to a third demux control signal DMCS3, fourth demux switches SWS4 that couple the source channels SC1, SC2, SC3 and SC4 to data lines coupled to three sub-pixels B4, G'4 and R4 of the (2-1)-th pixel group PG2-1 and one sub-pixel G6 of the (2-3)-th pixel group PG2-3 in response to a fourth demux control signal DMCS4, fifth demux switches SWS5 that couple the source channels SC1, SC2, SC3 and SC4 to data lines coupled to three sub-pixels B5, G'5 and R5 of the (2-2)-th pixel group PG2-2 and one sub-pixel G4 of the (2-1)-th pixel group PG2-1 in response to a fifth demux control signal DMCS5, and sixth demux switches SWS6 that couple the source channels SC1, SC2, SC3 and SC4 to data lines coupled to three sub-pixels B6, G'6 and R6 of the (2-3)-th pixel group PG2-3 and one sub-pixel G5 of the (2-2)-th pixel group PG2-2 in response to a sixth demux control signal DMCS6.

Accordingly, since data lines between adjacent sub-pixel columns may be substantially simultaneously driven and all sub-pixels located in twelve sub-pixel columns may be driven by four source channels SC1, SC2, SC3 and SC4, a coupling between the data lines may be prevented without a dummy source channel.

Figure 19:
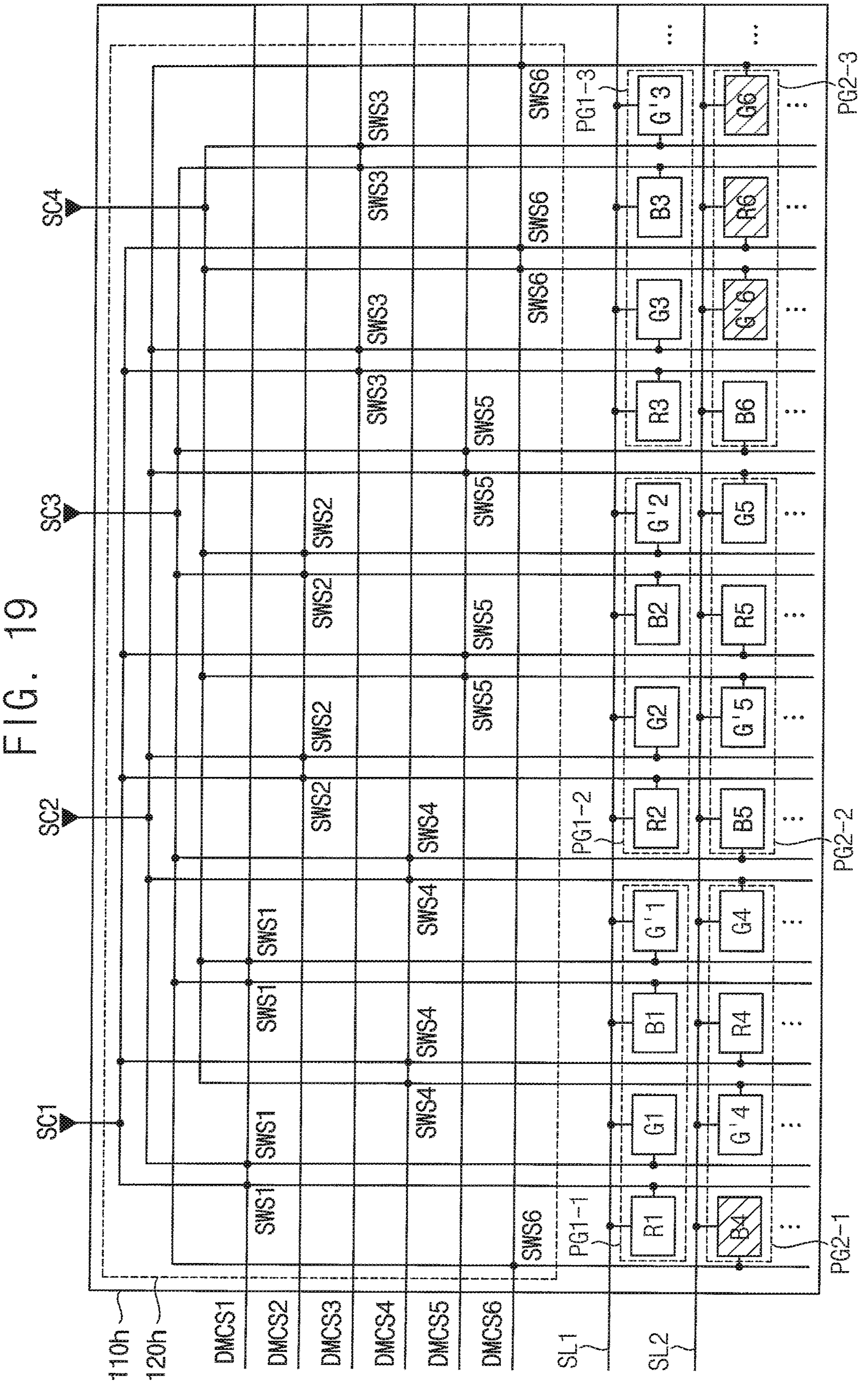
FIG. 19 is a diagram illustrating a display panel according to exemplary embodiments.

FIG. 19 is a diagram illustrating a display panel according to exemplary embodiments.

A display panel 110*h* of FIG. 19 may have a similar configuration and a similar operation to a display panel 110*g* of FIG. 18, except that, unlike the display panel 110*g* in which a left sub-pixel shift scheme is applied, a right sub-pixel shift scheme is applied with respect to a sub-pixel row corresponding to a second scan line SL2. Referring to FIG. 19, the display panel 110*g* may include first pixel groups PG1-1, PG1-2 and PG1-3 coupled to a first scan line SL1, second pixel groups PG2-1, PG2-2, PG2-3 coupled to the second scan line SL2, and a demultiplexer circuit 120*h*. In the display panel 110*h* of FIG. 19, since data lines between adjacent sub-pixel columns may be substantially simultaneously driven and all sub-pixels located in twelve sub-pixel columns may be driven by four source channels SC1, SC2, SC3 and SC4, a coupling between the data lines may be prevented without a dummy source channel.

Figure 20:
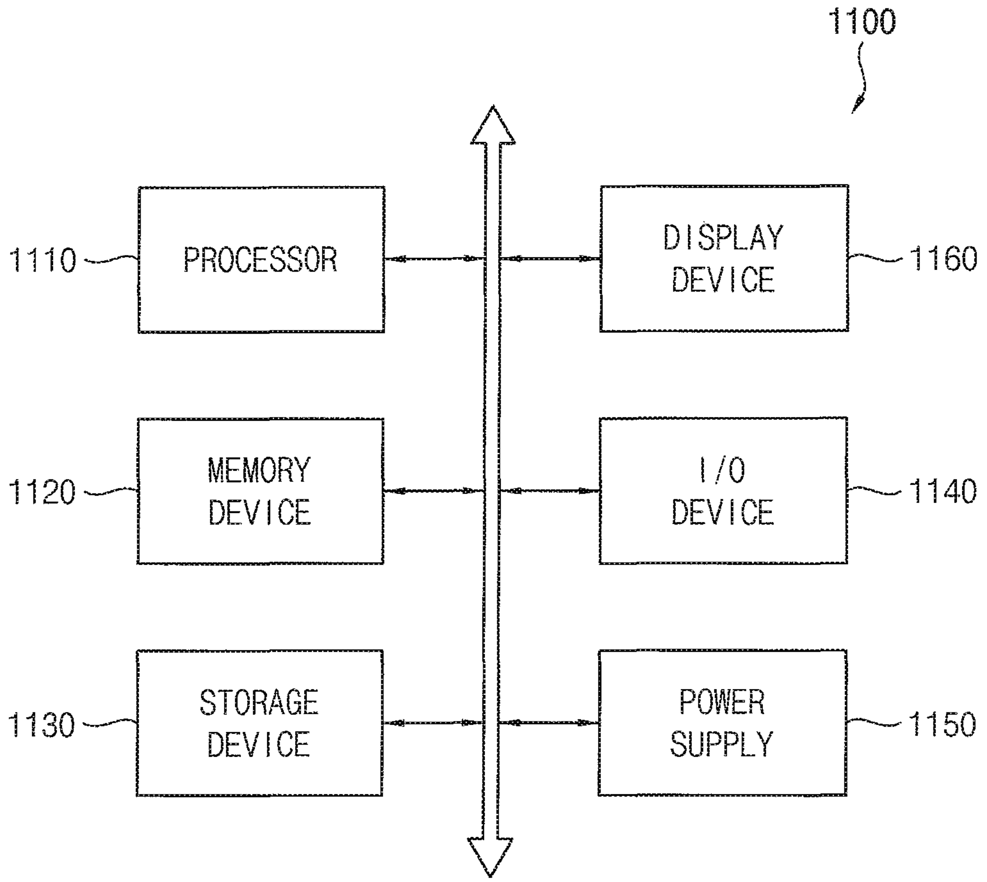
FIG. 20 is a block diagram illustrating an electronic device including a display device according to exemplary embodiments.

FIG. 20 is a block diagram illustrating an electronic device including a display device according to exemplary embodiments.

Referring to FIG. 20, an electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some exemplary embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

The display device 1160 may include first and second pixel groups coupled to a first scan line and third and fourth pixel groups coupled to a second scan line. The first and second pixel groups may be sequentially driven during a first scan on time, N−1 sub-pixels in the third pixel group and one sub-pixel in the fourth pixel group may be driven during a first portion of a second scan on time, and N−1 sub-pixels in the fourth pixel group and one sub-pixel in the third pixel group may be driven during a second portion of the second scan on time. Accordingly, in the display device 1160, a coupling between data lines may be prevented without a dummy source channel.

The inventive concepts may be applied any electronic device 1100 including the display device 1160. For example, the inventive concepts may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display panel comprising:

a plurality of sub-pixels disposed on a substrate, the plurality of sub-pixels being disposed in a matrix configuration having a plurality of columns and a plurality of rows;

first, second, third, fourth, fifth, sixth, seventh, eighth, ninth, tenth, eleventh, twelfth, thirteenth, fourteenth, fifteenth and sixteenth data lines sequentially disposed along a row direction, and a plurality of source channel lines, wherein each of the plurality of source channel lines is connected to at least three data lines, wherein the second, third, sixth and seventh data lines are coupled to first demux switches receiving a same first demux control signal, and wherein the first data line is connected to one of the plurality of source channel lines with at least two other data lines, wherein the plurality of sub-pixels includes:

a first R sub-pixel, a first G sub-pixel, a first B sub-pixel, a first G' sub-pixel, a second R sub-pixel, a second G sub-pixel, a second B sub-pixel and a second G' sub-pixel sequentially disposed along the row direction in a first row of the plurality of rows, and wherein the first R sub-pixel, the first G sub-pixel, the first B sub-pixel, the first G' sub-pixel, the second R sub-pixel, the second G sub-pixel, the second B sub-pixel and the second G' sub-pixel are coupled to the second, third, sixth, seventh, tenth, eleventh, fourteenth and fifteenth data lines, respectively.

2. The display panel of claim 1, wherein the first and sixteenth data lines are coupled to second demux switches receiving a same second demux control signal.

3. The display panel of claim 1, wherein the first, fourth and fifth data lines are coupled to second demux switches receiving a same second demux control signal.

4. The display panel of claim 1, wherein the eighth, ninth, twelfth and thirteenth data lines are coupled to second demux switches receiving a same second demux control signal.

5. The display panel of claim 1, wherein the tenth, eleventh, fourteenth and fifteenth data lines are coupled to second demux switches receiving a same second demux control signal, wherein the first, fourth, fifth and sixteenth data lines are coupled to third demux switches receiving a same third demux control signal, and wherein the eighth, ninth, twelfth and thirteenth data lines are coupled to fourth demux switches receiving a same fourth demux control signal.

6. The display panel of claim 1, wherein the first, third, fifth, seventh, ninth, eleventh, thirteenth and fifteenth data lines are disposed at left sides of first through eighth columns of the plurality of columns, and wherein the second, fourth, sixth, eighth, tenth, twelfth, fourteenth and sixteenth data lines are disposed at right sides of the first through eighth columns.

7. The display panel of claim 1, wherein the plurality of sub-pixels includes:

a third B sub-pixel, a third G' sub-pixel, a third R sub-pixel, a third G sub-pixel, a fourth B sub-pixel, a fourth G' sub-pixel, a fourth R sub-pixel and a fourth G sub-pixel sequentially disposed along the row direction in a second row of the plurality of rows.

8. The display panel of claim 7, wherein the third B sub-pixel, the third G' sub-pixel, the third R sub-pixel, the third G sub-pixel, the fourth B sub-pixel, the fourth G' sub-pixel, the fourth R sub-pixel and the fourth G sub-pixel are coupled to the first, fourth, fifth, eighth, ninth, twelfth, thirteenth and sixteenth data lines, respectively.

9. The display panel of claim 7, wherein a first scan on time for the first row includes a first sub-scan on time and a second sub-scan on time, the first R sub-pixel, the first G sub-pixel, the first B sub-pixel and the first G' sub-pixel are driven during the first sub-scan on time, and the second R sub-pixel, the second G sub-pixel, the second B sub-pixel and the second G' sub-pixel are driven during the second sub-scan on time, and wherein a second scan on time for the second row includes a third sub-scan on time and a fourth sub-scan on time, the third B sub-pixel, the third G' sub-pixel, the third R sub-pixel and the fourth G sub-pixel are driven during the third sub-scan on time, and the third G sub-pixel, the fourth B sub-pixel, the fourth G' sub-pixel and the fourth R sub-pixel are driven during the fourth sub-scan on time.

* * * * *